US012739432B2

(12) United States Patent
Zhang et al.

(10) Patent No.: US 12,739,432 B2
(45) Date of Patent: Sep. 15, 2026

(54) POINT CLOUD ENCODING METHOD AND APPARATUS, POINT CLOUD DECODING METHOD AND APPARATUS, AND ELECTRONIC DEVICE

(71) Applicant: VIVO MOBILE COMMUNICATION CO., LTD., Guangdong (CN)

(72) Inventors: Wei Zhang, Guangdong (CN); Fuzheng Yang, Guangdong (CN); Tengya Tian, Guangdong (CN); Zhuoyi Lv, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 18/678,558

(22) Filed: May 30, 2024

(65) Prior Publication Data

US 2024/0323436 A1 Sep. 26, 2024

Related U.S. Application Data

(63) Continuation of application No. PCT/CN2022/135878, filed on Dec. 1, 2022.

(30) Foreign Application Priority Data

Dec. 3, 2021 (CN) ........................ 202111466682.1

(51) Int. Cl.

*H04N 19/597* (2014.01)
*H04N 19/119* (2014.01)
(Continued)

(52) U.S. Cl.

CPC ......... *H04N 19/597* (2014.11); *H04N 19/119* (2014.11); *H04N 19/13* (2014.11); *H04N 19/96* (2014.11)

(58) Field of Classification Search

CPC .... H04N 19/597; H04N 19/119; H04N 19/13; H04N 19/96; H04N 19/167;
(Continued)

(56) References Cited

U.S. PATENT DOCUMENTS 10,693,492 B1 * 6/2020 Lasserre ................. H03M 7/40
2021/0021869 A1 1/2021 Wang et al.
(Continued)

FOREIGN PATENT DOCUMENTS

CN 112385236 A 2/2021
CN 112565795 A 3/2021
(Continued)

OTHER PUBLICATIONS

Zhang et al., International Organisation for Standardisation, Coding of Moving Pictures and Audio, "[G-PCC] CE13.37 report on planar coding improvement", ISO/IEC JTC 1/SC 29/WG 7, m55314, Online—Oct. 2020.

(Continued)

*Primary Examiner* — Tat C Chio
(74) *Attorney, Agent, or Firm* — Price Heneveld LLP

(57) ABSTRACT

This application pertains to the field of encoding and decoding technologies, and discloses a point cloud encoding method and apparatus, a point cloud decoding method and apparatus, and an electronic device. The point cloud encoding method in embodiments of this application includes: obtaining, by an encoder, a to-be-encoded node in a point cloud sequence and m encoded reference nodes in the point cloud sequence, where m is a positive integer; determining, by the encoder, a context of a to-be-encoded subnode based on occupancy information of the m reference nodes and a position of the to-be-encoded subnode in the to-be-encoded node, where the to-be-encoded subnode is any subnode obtained by partitioning the to-be-encoded node based on a structure tree; and performing, by the encoder, entropy encoding on the to-be-encoded subnode based on the context to generate a target bit stream.

16 Claims, 8 Drawing Sheets

(51) Int. Cl.
*H04N 19/13* (2014.01)
*H04N 19/96* (2014.01)

(58) Field of Classification Search
CPC ...... H04N 19/182; H04N 19/91; H04N 19/21; G06T 9/005; G06T 9/40
See application file for complete search history.

(56) References Cited

U.S. PATENT DOCUMENTS

| | | | |
|---|---|---|---|
| 2021/0272324 | A1 | 9/2021 | Lasserre et al. |
| 2023/0009083 | A1 | 1/2023 | Wan et al. |
| 2023/0065156 | A1 | 3/2023 | Yang et al. |
| 2023/0267651 | A1 | 8/2023 | Zhang et al. |

FOREIGN PATENT DOCUMENTS

| | | | |
|---|---|---|---|
| EP | 4149114 | A1 | 3/2023 |
| WO | 2019198636 | A1 | 10/2019 |
| WO | 2021189262 | A1 | 9/2021 |
| WO | 2021232251 | A1 | 11/2021 |

OTHER PUBLICATIONS

Xidian University, Xiaomi, International Organisation for Standardisation, Coding of Moving Pictures and Audio, "[G-PCC] [new proposal] Planar mode improvement", ISO/IEC JTC1/SC29/WG11, MPEG2020/m53522, Alpbach, AT, Apr. 2020.
Blackberry, International Organisation for Standardisation, Coding of Moving Pictures and Audio, "[PCC] Neighbour-dependent entropy coding of occupancy patterns in TMC3", ISO/IEC JTC1/SC29/WG11, MPEG2018/m42238, Jan. 2018, Gwangju, Korea.

* cited by examiner

POINT CLOUD ENCODING METHOD AND APPARATUS, POINT CLOUD DECODING METHOD AND APPARATUS, AND ELECTRONIC DEVICE

CROSS-REFERENCE TO RELATED APPLICATIONS

This application is a continuation application of PCT Application No. PCT/CN2022/135878 filed on Dec. 1, 2022, which claims priority to Chinese Patent Application No. 202111466682.1, filed in China on Dec. 3, 2021, the disclosures of which are incorporated herein by reference in their entireties.

TECHNICAL FIELD

This application pertains to the field of encoding and decoding technologies, and specifically relates to a point cloud encoding method and apparatus, a point cloud decoding method and apparatus, and an electronic device.

BACKGROUND

In a point cloud digital audio video coding/decoding technical standard (Audio Video coding Standard, AVS) encoder framework, geometric information of a point cloud and attribute information corresponding to each point are encoded separately. Currently, a spatial occupancy code is encoded by using a context-based adaptive binary arithmetic encoder, and a sparse point cloud sequence and a dense point cloud sequence are respectively encoded by using different context models. However, for a point cloud sequence with plenty of planar features, because the point cloud sequence has unoccupied space, if an encoding mode based on a sparse point cloud sequence and an encoding mode based on a dense point cloud sequence are still used for encoding, encoding efficiency is low.

SUMMARY

According to a first aspect, a point cloud encoding method is provided and includes:

obtaining, by an encoder, a to-be-encoded node in a point cloud sequence and m encoded reference nodes in the point cloud sequence, where m is a positive integer;

determining, by the encoder, a context of a to-be-encoded subnode based on occupancy information of the m reference nodes and a position of the to-be-encoded subnode in the to-be-encoded node, where the to-be-encoded subnode is any subnode obtained by partitioning the to-be-encoded node based on a structure tree; and performing, by the encoder, entropy encoding on the to-be-encoded subnode based on the context to generate a target bit stream.

According to a second aspect, a point cloud decoding method is provided and includes:

obtaining, by a decoder, a to-be-decoded node in a point cloud sequence and m decoded reference nodes in the point cloud sequence, where m is a positive integer;

determining, by the decoder, a context of a to-be-decoded subnode based on occupancy information of the m reference nodes and a position of the to-be-decoded subnode in the to-be-decoded node, where the to-be-decoded subnode is any subnode obtained by partitioning the to-be-decoded node based on a structure tree; and performing, by the decoder, entropy decoding on the to-be-decoded subnode based on the context to generate a target bit stream.

According to a third aspect, a point cloud encoding apparatus is provided and includes:

a first obtaining module, configured to obtain a to-be-encoded node in a point cloud sequence and m encoded reference nodes in the point cloud sequence, where m is a positive integer;

a first determining module, configured to determine a context of a to-be-encoded subnode based on occupancy information of the m reference nodes and a position of the to-be-encoded subnode in the to-be-encoded node, where the to-be-encoded subnode is any subnode obtained by partitioning the to-be-encoded node based on a structure tree; and an encoding module, configured to perform entropy encoding on the to-be-encoded subnode based on the context to generate a target bit stream.

According to a fourth aspect, a point cloud decoding apparatus is provided and includes:

a second obtaining module, configured to obtain a to-be-decoded node in a point cloud sequence and m decoded reference nodes in the point cloud sequence, where m is a positive integer;

a second determining module, configured to determine a context of a to-be-decoded subnode based on occupancy information of the m reference nodes and a position of the to-be-decoded subnode in the to-be-decoded node, where the to-be-decoded subnode is any subnode obtained by partitioning the to-be-decoded node based on a structure tree; and a decoding module, configured to perform entropy decoding on the to-be-decoded subnode based on the context to generate a target bit stream.

According to a fifth aspect, an electronic device is provided. The electronic device includes a processor and a memory. The memory stores a program or instructions capable of running on the processor. When the program or instructions are executed by the processor, the steps of the point cloud encoding method according to the first aspect are implemented, or the steps of the point cloud decoding method according to the second aspect are implemented.

According to a sixth aspect, a readable storage medium is provided. The readable storage medium stores a program or instructions. When the program or instructions are executed by a processor, the steps of the point cloud encoding method according to the first aspect are implemented, or the steps of the point cloud decoding method according to the second aspect are implemented.

According to a seventh aspect, a chip is provided. The chip includes a processor and a communication interface. The communication interface is coupled to the processor. The processor is configured to run a program or instructions to implement the method according to the first aspect or implement the method according to the second aspect.

According to an eighth aspect, a computer program or program product is provided. The computer program or program product is stored in a storage medium. The computer program or program product is executed by at least one processor to implement the method according to the first aspect or implement the method according to the second aspect.

According to a ninth aspect, a communication device is provided, and configured to implement the method according to the first aspect or implement the method according to the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

For better understanding the technical solutions of this application, the following briefly describes the related art involved in the technical solutions of this application.

Figure 1:
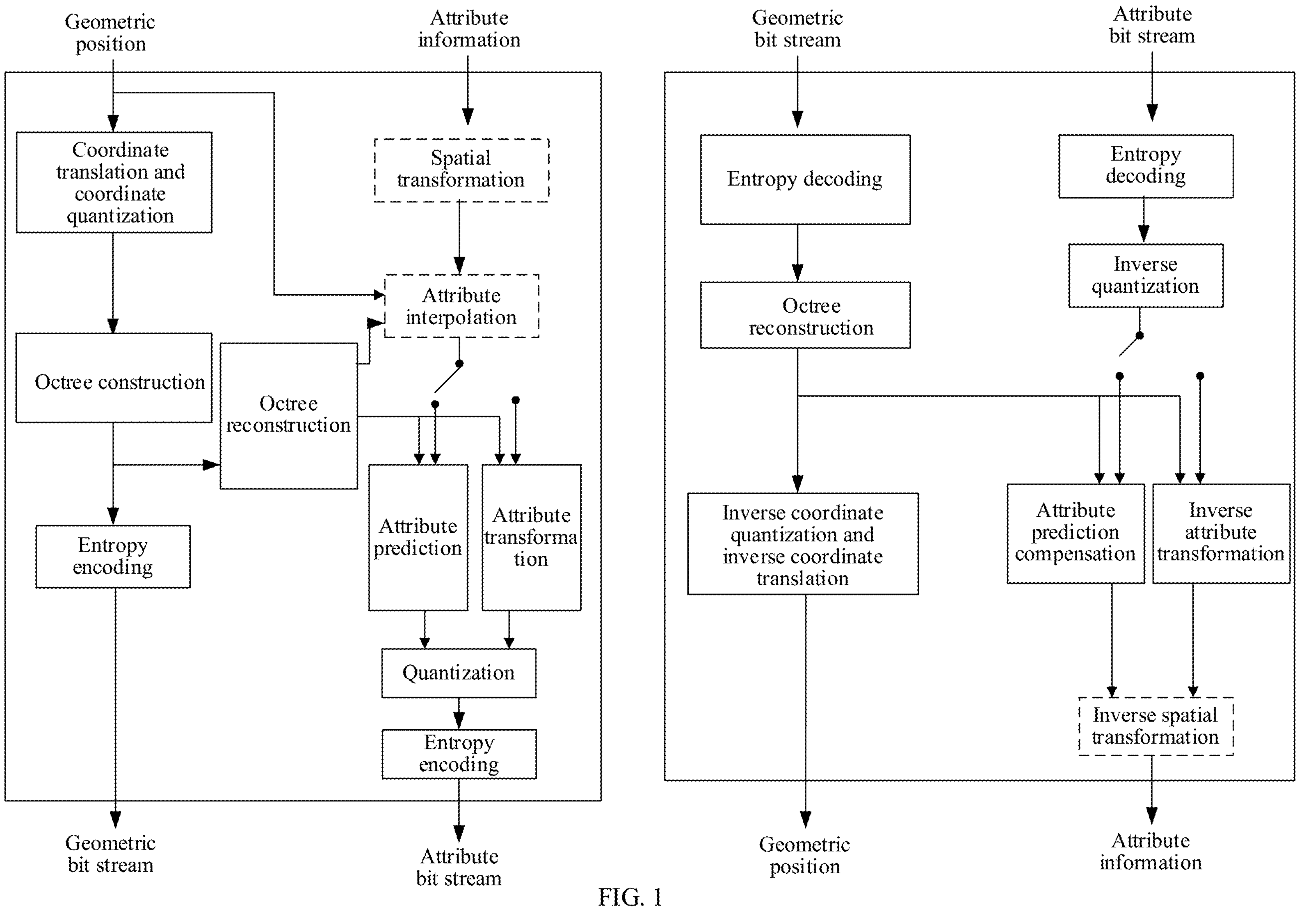
FIG. 1 is a framework diagram of an AVS codec.

FIG. 1 is a framework diagram of an AVS codec. In a point cloud AVS encoder framework, geometric information of a point cloud and attribute information corresponding to each point are encoded separately. First, the point cloud is preprocessed. A minimum cuboid containing all points in the input point cloud is constructed first. The cuboid is referred to as a bounding box. Coordinates of an origin of the bounding box include minimum values of coordinates of each point in the point cloud in three dimensions of x, y, and z. Then coordinate transformation (that is, coordinate translation shown in FIG. 1) is performed on the points in the point cloud. Based on this coordinate origin, original coordinates of the points are transformed into relative coordinates relative to the coordinate origin. Then geometric coordinates of the points are quantized. The quantization step mainly plays a role of scaling. Due to quantization and rounding, geometric information of some points is the same. Whether to remove these points with duplicate geometric information is determined based on a parameter. Then the preprocessed point cloud is partitioned in an order of breadth-first traversal based on a structure tree (for example, an octree, a quadtree, or a binary tree). Partitioning based on the octree shown in FIG. 1 is used as an example. As a root node, the preprocessed bounding box is partitioned into eight equal parts to generate eight sub-cubes used as subnodes of the root node, and eight bits are used to represent occupancy information of the subnodes of the root node (also referred to as occupancy information), which is referred to as a spatial occupancy code. Presence of a point in a sub-cube indicates that the subnode is occupied. In this case, a corresponding occupancy bit value is 1; otherwise, the value is 0. The occupied sub-cube continues to be partitioned, and the partitioning is not stopped until a leaf node obtained through partitioning is a 1×1×1 unit cube. Octree-based geometric encoding is completed. In the octree-based encoding process, entropy encoding is performed on the generated spatial occupancy code and the number of points included in the final leaf node to obtain an output bit stream. In an octree-based geometric decoding process, a decoder obtains an occupancy code of each node through continuous parsing in the order of breadth-first traversal, sequentially and continuously partitions the nodes, and does not stop partitioning until 1×1×1 unit cubes are obtained through partitioning. The number of points included in each leaf node is obtained through parsing, and geometrically reconstructed point cloud information is finally obtained through recovery.

After the geometric encoding is completed, the geometric information is reconstructed. Currently, attribute encoding is mainly performed on attribute information such as color and reflectivity information. First, whether color space conversion is performed is determined. If color space conversion is performed, color information is converted from a red green blue (RGB) color space to a luminance chrominance (YUV) color space. Then the reconstructed point cloud is recolored by using an original point cloud, so that uncoded attribute information corresponds to the reconstructed geometric information. There are two modules in color information encoding: attribute prediction and attribute transformation. An attribute prediction process is as follows: First, point clouds are reordered and then differential prediction is performed. A reordering method is Hilbert (Hilbert) reordering. Attribute prediction is performed on the reordered point clouds in a differential manner. Finally, quantization and entropy encoding are performed on prediction residuals to generate a binary bit stream. An attribute transformation process is as follows: First, wavelet transformation is performed on an attribute of a point cloud, and a transform coefficient is quantized; then a reconstructed value of the attribute is obtained through inverse quantization and inverse wavelet transformation; then a difference between an original attribute and the reconstructed value of the attribute is calculated, so that an attribute residual is obtained and quantized; and finally, entropy encoding is performed on the quantized transform coefficient and the attribute residual to generate a binary bit stream.

A point cloud encoding method provided in the embodiments of this application is hereinafter described in detail by using some embodiments and application scenarios thereof with reference to the accompanying drawings.

Figure 2:
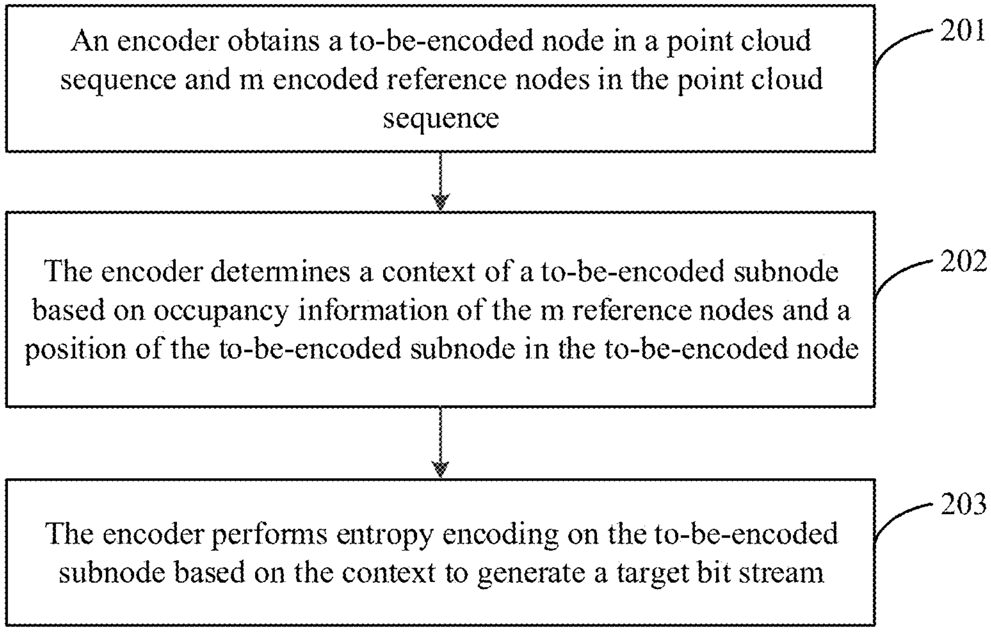
FIG. 2 is a flowchart of a point cloud encoding method according to an embodiment of this application.

FIG. 2 is a flowchart of a point cloud encoding method according to an embodiment of this application. As shown in FIG. 2, the method includes the following steps.

Step 201: An encoder obtains a to-be-encoded node in a point cloud sequence and m encoded reference nodes in the point cloud sequence.

m is a positive integer. The encoder may be an electronic device such as a mobile phone, a tablet computer, or a computer. This is not specifically limited in this application.

It should be noted that the encoder can sequentially encode nodes in the point cloud sequence based on a preset encoding order. The to-be-encoded node may be a first uncoded node arranged in the preset encoding order among uncoded nodes in the point cloud sequence. The reference node is an encoded node in the point cloud sequence. For example, the reference node may also be any one of encoded nodes, or the reference node may be any one of encoded nodes belonging to a same node partitioning level as the to-be-encoded node, or the reference node may be an encoded node neighboring to the to-be-encoded node.

The node partitioning level is a node level obtained after a node is partitioned based on a structure tree (for example, a binary tree, a quadtree, or an octree). For example, a node 11 and a node 12 are obtained by partitioning a node 1 based on the binary tree; a node 111 and a node 112 are obtained by partitioning the node 11 based on the binary tree; and a node 121 and a node 122 are obtained by partitioning the node 12 based on the binary tree, where the node 11 and the node 12 belong to a same node partitioning level, and the node 111, the node 112, the node 121, and the node 122 belong to a same node partitioning level.

Step 202: The encoder determines a context of a to-be-encoded subnode based on occupancy information of the m reference nodes and a position of the to-be-encoded subnode in the to-be-encoded node, where the to-be-encoded subnode is any subnode obtained by partitioning the to-be-encoded node based on the structure tree.

Figure 3A:
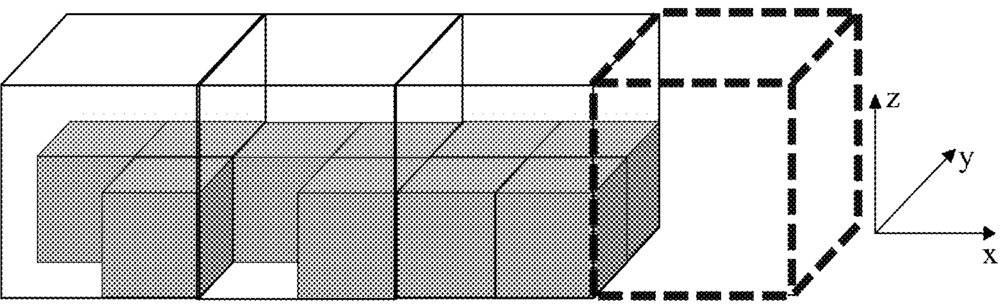
FIG. 3*a* is a schematic diagram of a to-be-encoded node and reference nodes in a point cloud sequence.
Figure 3B:
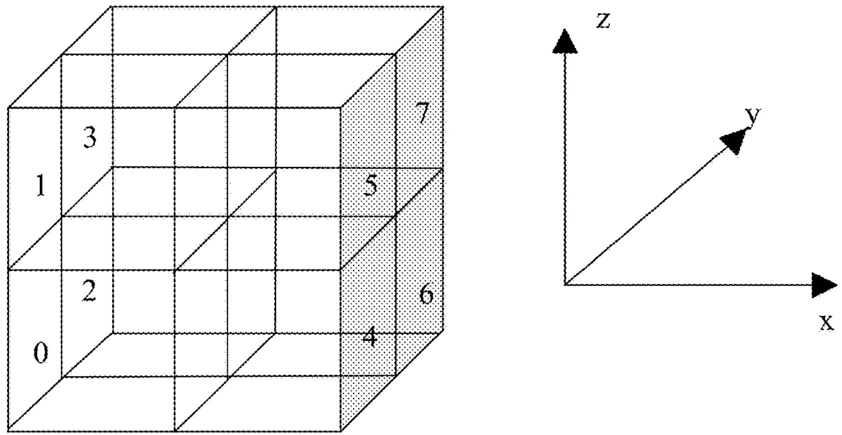
FIG. 3*b* is a schematic diagram of nodes in a point cloud sequence.

Occupancy information of a node refers to an occupancy case of each subnode obtained by partitioning the node based on the structure tree, and the occupancy case includes "occupied" and "unoccupied". The occupancy information of the reference node may refer to an occupancy case of each subnode of the reference node. For example, a subnode 1 and a subnode 2 are obtained by partitioning the reference node based on the binary tree, and the occupancy information of the reference node may be expressed as "the subnode 1 is occupied, and the subnode 2 is unoccupied". Alternatively, the occupancy information of the reference node may refer to the number of occupied subnodes and the number of unoccupied subnodes in the reference node. For example, eight subnodes are obtained by partitioning the reference node based on the octree, and the occupancy information of the reference node may be expressed as "the number of occupied subnodes is 3, and the number of unoccupied subnodes is 5". Alternatively, the occupancy information of the reference node may refer to an occupancy case of each subnode of the reference node in a preset area. For example, eight subnodes are obtained by partitioning the reference node based on the octree, and the occupancy information of the reference node may be expressed as an occupancy case in a low planar area and an occupancy case in a high planar area, where the low planar area and the high planar area may be two planar areas of the reference node in a target direction. As shown in FIG. 3*a*, in a z-axis direction of a coordinate system, subnodes (filled subnodes in FIG. 3) in the low planar area of the reference node are occupied, while subnodes (unfilled subnodes in FIG. 3*a*) in the high planar area are unoccupied. Optionally, the occupancy information of the reference node may also be expressed in other ways. Details are not described in this application.

It may be understood that because the reference node is an encoded node in the point cloud sequence, the occupancy information of the encoded reference node can be obtained. In this embodiment of this application, after obtaining the m reference nodes, the encoder predicts occupancy information of the to-be-encoded node based on the occupancy information of the m reference nodes, to determine a prediction result of the to-be-encoded node.

For example, refer to FIG. 3*a*. In FIG. 3*a*, a dashed-line box identifies the to-be-encoded node, and a solid-line box represents a reference node. There are three reference nodes in FIG. 3*a*. A filled part represents occupied subnodes. It is assumed that eight subnodes are obtained by partitioning these nodes based on the octree. In the z-axis direction, four lower subnodes are subnodes in the low planar area, and four upper nodes are subnodes in the high planar area. If the occupancy information of the reference node is the occupancy case in the low planar area and the occupancy case in the high planar area of the reference node, the occupied subnodes of the three reference nodes in FIG. 3*a* are all located in the low planar area, and the unoccupied subnodes are all located in the high planar area. Based on the occupancy information of the three reference nodes, it can be predicted that occupied subnodes of the to-be-encoded node may also be located in the low planar area. In this way, a prediction result about the occupancy information of the to-be-encoded node is obtained.

It should be noted that after obtaining the to-be-encoded node, the encoder may partition the to-be-encoded node based on the structure tree such as the octree, the quadtree, or the binary tree. For example, based on the octree, eight subnodes are obtained by partitioning the encoded node belonging to the same node partitioning level as the to-be-encoded node. In this case, eight subnodes are also obtained by partitioning the to-be-encoded node based on the octree. Further, the encoder sequentially encodes, based on the preset encoding order, the subnodes obtained by partitioning the to-be-encoded node, where the to-be-encoded subnode is any uncoded subnode obtained by partitioning the to-be-encoded node based on the structure tree.

In this embodiment of this application, the encoder predicts the occupancy information of the to-be-encoded node based on the m reference nodes, and after obtaining the prediction result of the to-be-encoded node, the encoder determines the context of the to-be-encoded subnode based on the prediction result and the position of the to-be-encoded subnode in the to-be-encoded node.

Step 203: The encoder performs entropy encoding on the to-be-encoded subnode based on the context to generate a target bit stream.

Optionally, after determining the context of the to-be-encoded subnode, the encoder assigns an adaptive probability model to the to-be-encoded subnode, and can perform arithmetic encoding, that is, entropy encoding, on an occupancy bit code of the to-be-encoded subnode based on the adaptive probability model, to generate a target bit stream, for example, generate a binary bit stream.

In this embodiment of this application, the encoder can predict the occupancy information of the to-be-encoded node based on the occupancy information of the encoded reference nodes, and determine the context of the to-be-encoded subnode based on the prediction result of the to-be-encoded node and the position of the to-be-encoded subnode in the to-be-encoded node. In this way, the occupancy information of the encoded nodes in the point cloud sequence can be better used, geometric compression performance of the point cloud can be improved, and encoding efficiency of the encoder can be improved.

Optionally, step 201 may include:

the encoder obtains the to-be-encoded node in the point cloud sequence;

the encoder obtains, based on a node encoding order, k encoded nodes previous to the to-be-encoded node, where k is a positive integer; and in a case that at least one of the previous k encoded nodes has a target planar feature, the encoder obtains the m encoded reference nodes in the point cloud sequence.

In this embodiment of this application, after obtaining the to-be-encoded node in the point cloud sequence, the encoder obtains, based on the node encoding order, the k encoded nodes previous to the to-be-encoded node. For example, assuming that eight nodes arranged in the node encoding order are a node 0, a node 1, a node 2, . . . , a node 7, if the to-be-encoded node is the node 7, nodes previous to the node 7 are all encoded. Assuming that a value of k is 3, three encoded nodes previous to the to-be-encoded node are the node 4, the node 5, and the node 6.

Further, in a case that at least one of the previous k encoded nodes has the target planar feature, the encoder obtains the m encoded reference nodes in the point cloud sequence. Optionally, the m reference nodes may be nodes among the k encoded nodes, where m≤k; or the m reference nodes may not belong to the k encoded nodes, or may only partially belong to the k encoded nodes. For example, the m reference nodes may be m encoded nodes neighboring to the to-be-encoded node. In this case, these reference nodes are irrelevant to the encoding order, and some of the reference nodes do not belong to the previous k encoded nodes.

Optionally, the target planar feature may mean: n subnodes obtained by partitioning a node based on an n-ary tree are divided into two planes in a direction of a target coordinate axis, and occupied subnodes are all located in one of the planes, while none of subnodes in the other plane is occupied, and this node is a node having the target planar feature. For example, eight subnodes are obtained by partitioning a node in FIG. 3*b* based on the octree, where subnodes numbered 0, 2, 4, and 6 constitute a first plane, and subnodes numbered 1, 3, 5, and 7 constitute a second plane. If at least one of the four subnodes in the first plane is occupied, while none of the four subnodes in the second plane is occupied, or if none of the four subnodes in the first plane is occupied, while at least one of the four subnodes in the second plane is occupied, the node is a node having the target planar feature.

In this embodiment of this application, in a case that at least one of the k encoded nodes previous to the to-be-encoded node has the target planar feature, it is considered that the to-be-encoded node may also have the target planar feature. For example, the occupied subnodes of the to-be-encoded node are all located in the first plane or the second plane, and the encoder obtains the m encoded reference nodes in the point cloud sequence, to predict the occupancy information of the to-be-encoded node based on the occupancy information of the m reference nodes. By determining whether at least one of the k encoded nodes has the target planar feature, accuracy of predicting the occupancy information of the to-be-encoded node can be improved.

Optionally, if none of the previous k encoded nodes has the target planar feature, the encoder may not obtain the m encoded reference nodes. Then the encoder does not predict the occupancy information of the to-be-encoded node based on the occupancy information of the reference nodes, and the encoder may perform entropy encoding on the to-be-encoded node by using an existing related means. Details are not described herein.

Optionally, that the encoder obtains the m encoded reference nodes in the point cloud sequence in a case that at least one of the previous k encoded nodes has a target planar feature includes:

in a case that the number of encoded nodes with the target planar feature among the previous k encoded nodes is greater than or equal to a first threshold, the encoder obtains the m encoded reference nodes in the point cloud sequence, where the first threshold is a positive integer less than k.

In this embodiment of this application, after obtaining the k encoded nodes previous to the to-be-encoded node, the encoder further obtains the number of encoded nodes with the target planar feature among the previous k encoded nodes. If the number of encoded nodes with the target planar feature is greater than or equal to the first threshold, it may be considered that the to-be-encoded node may also have the target planar feature. For example, the occupied subnodes of the to-be-encoded node are all located in the first plane or the second plane. In this case, the encoder further obtains the m encoded reference nodes in the point cloud sequence.

Optionally, the first threshold may be a value preset by a user, or may be an empirical value obtained by the encoder based on finite tests.

Optionally, step 201 may further specifically include:

the encoder obtains the to-be-encoded node in the point cloud sequence;

the encoder determines a target coordinate system based on coordinate values of the to-be-encoded node;

the encoder determines that nodes belonging to a same node partitioning level as the to-be-encoded node and having a same coordinate value on a target coordinate axis as the to-be-encoded node, in the point cloud sequence, are candidate reference nodes, where the target coordinate axis is any coordinate axis in the target coordinate system, and the target coordinate axis is perpendicular to a target plane; and the encoder obtains the m reference nodes from the candidate reference nodes.

It may be understood that geometric information of a node in the point cloud sequence may be represented by coordinate values (for example, x1, y1, z1) of the node in a Cartesian coordinate system. In this case, each node in the point cloud sequence includes corresponding coordinate values. In this embodiment of this application, after obtaining the to-be-encoded node in the point cloud sequence, the encoder can also accordingly obtain the coordinate values corresponding to the to-be-encoded node, and determine the target coordinate system based on the coordinate values, where the target coordinate system is a target system corresponding to the coordinate values of the to-be-encoded node. It may be understood that, based on the target coordinate system, the encoder can determine a coordinate origin and each coordinate axis of the target coordinate system, and can also obtain coordinate values of other nodes in the point cloud sequence. Based on the coordinate values of the node, relative positions of the node and the to-be-encoded node can also be determined.

The encoder determines that the nodes belonging to the same node partitioning level as the to-be-encoded node and having the same coordinate value on the target coordinate axis as the to-be-encoded node, in the point cloud sequence, are the candidate reference nodes. For example, assuming that the target coordinate axis is a z-axis and that the coordinate values of the to-be-encoded node are (x1, y1, z1), the candidate reference nodes are encoded nodes whose z-axis coordinate values are also z1, and coordinate values of the reference nodes may be expressed as (x1−a*xNodeSize, y1−b*yNodeSize, z1), where a and b are both integers greater than or equal to 0, and a and b cannot be both 0, xNodeSize is a node side length of the to-be-encoded node in an x-axis direction, and yNodeSize is a node side length of the to-be-encoded node in a y-axis direction. Further, the m reference nodes are selected from these reference nodes.

It should be noted that the target planar feature may be determined based on the target coordinate axis. For example, assuming that the target coordinate axis is the z-axis, the target plane is a plane perpendicular to the z-axis. In a case that subnodes obtained by partitioning a node based on the structure tree are located in the target plane, the node is a node having the target planar feature.

In this embodiment of this application, the encoder predicts the occupancy information of the to-be-encoded node based on the occupancy information of the m reference nodes, where the m reference nodes are selected from the nodes belonging to the same node partitioning level as the to-be-encoded node and having the same coordinate value on the target coordinate axis as the to-be-encoded node, in the point cloud sequence, and the m reference nodes are nodes surrounding the to-be-encoded node. In this way, a spatial geometric relationship between nodes in the point cloud sequence can be used effectively, and further, accuracy of predicting an occupancy case of the to-be-encoded node can be improved.

Optionally, the occupancy information of the m encoded reference nodes in the point cloud sequence includes the number of occupied first subnodes and the number of occupied second subnodes in the m reference nodes; and the method further includes:

- the encoder determines a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system; and
- the encoder obtains the number of the occupied first subnodes and the number of the occupied second subnodes in the m reference nodes, where the first subnodes are subnodes located in the first plane and the second subnodes are subnodes located in the second plane.

Optionally, step 202 specifically includes:

- the encoder predicts the occupancy information of the to-be-encoded node based on the occupancy information of the m reference nodes, and determines the prediction result of the to-be-encoded node; and
- the encoder determines the context of the to-be-encoded subnode based on the prediction result of the to-be-encoded node and the position of the to-be-encoded subnode in the to-be-encoded node.

Optionally, that the encoder predicts the occupancy information of the to-be-encoded node based on the occupancy information of the m reference nodes, and determines the prediction result of the to-be-encoded node includes:

- the encoder determines a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system;
- the encoder obtains the number of occupied first subnodes and the number of occupied second subnodes in the m reference nodes, where the first subnodes are subnodes located in the first plane and the second subnodes are subnodes located in the second plane; and
- the encoder predicts the occupancy information of the to-be-encoded node based on the number of the occupied first subnodes and the number of the occupied second subnodes in the m reference nodes, and determines the prediction result of the to-be-encoded node.

It should be noted that the encoder can partition, in the foregoing manner, any node in the point cloud sequence into a first plane and a second plane, including but not limited to the reference node and the to-be-encoded node. For example, refer to FIG. 3*a*. In FIG. 3*a*, the dashed-line box represents the to-be-encoded node, and the solid-line box represents the reference node. There are three reference nodes in FIG. 3*a*. Eight subnodes are obtained by partitioning these nodes based on the octree. Assuming that the target coordinate axis is the z-axis, using a leftmost reference node as an example, a first plane of the reference node is a plane in which four lower nodes are located, and a second plane thereof is a plane in which four upper nodes are located. Similarly, a first plane of another reference node is a plane in which four lower nodes are located, and a second plane thereof is a plane in which four upper nodes are located.

Optionally, the target coordinate axis may alternatively be an x-axis or a y-axis. Correspondingly, the first plane and the second plane are alternatively planes perpendicular to the x-axis or the y-axis. Details are not described herein.

In this embodiment of this application, based on partitioning of the node into the first plane and the second plane, the number of the occupied first subnodes in the first plane and the number of the occupied second subnodes in the second plane in the m reference nodes can be obtained, and the occupancy information of the to-be-encoded node is predicted based on the number of the occupied first subnodes and the number of the occupied second subnodes, so that the prediction result of the to-be-encoded node is determined.

Still refer to FIG. 3*a*. In FIG. 3*a*, the dashed-line box identifies the to-be-encoded node, and the solid-line box represents the reference node. There are three reference nodes in FIG. 3*a*. The filled part represents the occupied subnodes. In FIG. 3*a*, the number of occupied first subnodes is 10, and the number of occupied second subnodes is 0. It can be learned that the number of occupied first subnodes is greater than the number of occupied second subnodes, and occupied subnodes of the reference node are all located in the first plane. In this case, it is predicted that the occupancy information of the to-be-encoded node may also be that the occupied subnodes are located in the first plane and that none of the subnodes in the second plane is occupied.

Optionally, that the encoder predicts the occupancy information of the to-be-encoded node based on the number of the occupied first subnodes and the number of the occupied second subnodes in the m reference nodes, and determines the prediction result of the to-be-encoded node includes at least one of the following:

in a case that the number of the occupied first subnodes and the number of the occupied second subnodes in the m reference nodes meet a first condition, the encoder predicts that at least one first subnode in the to-be-encoded node is occupied and that no second subnode in the to-be-encoded node is occupied, and determines that the prediction result of the to-be-encoded node is a first prediction result, where the first condition is that the number of the occupied first subnodes in the m reference nodes is greater than a second threshold and that the number of the occupied second subnodes in the m reference nodes is less than a third threshold;

in a case that the number of the occupied first subnodes and the number of the occupied second subnodes in the m reference nodes meet a second condition, the encoder predicts that at least one second subnode in the to-be-encoded node is occupied and that no first subnode in the to-be-encoded node is occupied, and determines that the prediction result of the to-be-encoded node is a second prediction result, where the second condition is that the number of the occupied second subnodes in the m reference nodes is greater than the second threshold and that the number of the occupied first subnodes in the m reference nodes is less than the third threshold; and in a case that the number of the occupied first subnodes and the number of the occupied second subnodes in the m reference nodes meet neither of the first condition and the second condition, the encoder predicts that at least one first subnode and at least one second subnode in the to-be-encoded node are occupied, and determines that the prediction result of the to-be-encoded node is a third prediction result.

In this embodiment of this application, if the number of the occupied subnodes in the first plane in the m reference nodes, that is, the number of the occupied first subnodes, is greater than the second threshold, and the number of the occupied subnodes in the second plane in the m reference nodes, that is, the number of the occupied second subnodes, is less than the third threshold, the prediction result of the to-be-encoded node is the first prediction result: at least one first subnode in the first plane of the to-be-encoded node is occupied, and no second subnode in the second plane of the to-be-encoded node is occupied.

If the number of the occupied first subnodes in the first plane in the m reference nodes is less than the third threshold, and the number of the occupied second subnodes in the second plane in the m reference nodes is greater than the second threshold, the prediction result of the to-be-encoded node is the second prediction result: no first subnode in the first plane of the to-be-encoded node is occupied, and at least one second subnode in the second plane of the to-be-encoded node is occupied.

If the number of the occupied first subnodes in the first plane and the number of the occupied second subnodes in the second plane in the m reference nodes meet neither of the first condition and the second condition, for example, if the number of the occupied first subnodes in the m reference nodes is less than the second threshold, and the number of the occupied second subnodes is greater than the third threshold, or the number of the occupied first subnodes in the m reference nodes is less than the second threshold, and the number of the occupied second subnodes is less than the third threshold, the prediction result of the to-be-encoded node is the third prediction result: at least one first subnode in the first plane of the to-be-encoded node is occupied, and at least one second subnode in the second plane is occupied.

In this embodiment of this application, the occupancy information of the to-be-encoded node is predicted by comparing the number of the occupied first subnodes and the number of the occupied second subnodes with the second threshold and the third threshold. Therefore, accuracy of predicting the occupancy case of the to-be-encoded node is effectively improved.

Optionally, in a case that the first subnodes and the second subnodes in the reference nodes are obtained through partitioning based on an n-ary tree, the second threshold is a positive integer less than or equal to $$\frac{n}{2} \times m - 1,$$

the third threshold is a positive integer less than or equal to $$\frac{n}{2} \times m,$$

and n is a positive integer.

For example, if the first subnodes and the second subnodes in the reference nodes are obtained through partitioning based on the octree, that is, a value of n is 8, assuming that the number of reference nodes is 3, that is, the value of m is 3, the second threshold is a positive integer less than or equal to 11, and the third threshold is a positive integer less than or equal to 12.

In this embodiment of this application, after determining the prediction result of the to-be-encoded node, the encoder determines the context of the to-be-encoded subnode based on the prediction result and the position of the to-be-encoded subnode in the to-be-encoded node. Optionally, step 202 may specifically include at least one of the following:

in a case that the prediction result of the to-be-encoded node is the first prediction result and that the to-be-encoded subnode is located in the second plane of the to-be-encoded node, the encoder determines that a first preset model is the context of the to-be-encoded subnode;

in a case that the prediction result of the to-be-encoded node is the second prediction result and that the to-be-encoded subnode is located in the first plane of the to-be-encoded node, the encoder determines that a second preset model is the context of the to-be-encoded subnode;

in a case that the prediction result of the to-be-encoded node is the first prediction result and that the to-be-encoded subnode is located in the first plane of the to-be-encoded node, the encoder obtains a neighboring node of the to-be-encoded subnode, and determines the context of the to-be-encoded subnode based on an occupancy case of the neighboring node;

in a case that the prediction result of the to-be-encoded node is the second prediction result and that the to-be-encoded subnode is located in the second plane of the to-be-encoded node, the encoder obtains a neighboring node of the to-be-encoded subnode, and determines the context of the to-be-encoded subnode based on an occupancy case of the neighboring node; and in a case that the prediction result of the to-be-encoded node is the third prediction result, the encoder obtains a neighboring node of the to-be-encoded subnode, and determines the context of the to-be-encoded subnode based on an occupancy case of the neighboring node.

Specifically, if the encoder determines that the prediction result of the to-be-encoded node is the first prediction result, that is, if it is predicted that at least one first subnode in the first plane of the to-be-encoded node is occupied and that no second subnode in the second plane of the to-be-encoded node is occupied, for the to-be-encoded subnode located in the second plane of the to-be-encoded node, the encoder determines that the first preset model is the context of the to-be-encoded subnode, that is, assigns the first preset model to the to-be-encoded subnode, where the first preset model is an adaptive probability model; and the encoder performs arithmetic encoding on the occupancy bit code of the to-be-encoded subnode based on the adaptive probability model, to generate the target bit stream.

If the encoder determines that the prediction result of the to-be-encoded node is the second prediction result, that is, if no first subnode in the first plane of the to-be-encoded node is occupied, and at least one second subnode in the second plane of the to-be-encoded node is occupied, for the to-be-encoded subnode located in the first plane of the to-be-encoded node, the encoder determines that the second preset model is the context of the to-be-encoded subnode, that is, assigns the second preset model to the to-be-encoded subnode, where the second preset model is also an adaptive probability model; and the encoder performs arithmetic encoding on the occupancy bit code of the to-be-encoded subnode based on the adaptive probability model, to generate the target bit stream. Optionally, the first preset model and the second preset model may be a same probability model, for example, both are the adaptive probability model.

If the encoder determines that the prediction result of the to-be-encoded node is the first prediction result, for the to-be-encoded subnode located in the first plane of the to-be-encoded node, the encoder obtains the neighboring node of the to-be-encoded subnode, and determines the context of the to-be-encoded subnode based on the occupancy case of the neighboring node.

If the encoder determines that the prediction result of the to-be-encoded node is the second prediction result, for the to-be-encoded subnode located in the second plane of the to-be-encoded node, the encoder may also obtain the neighboring node of the to-be-encoded subnode, and determine the context of the to-be-encoded subnode based on the occupancy case of the neighboring node.

If the encoder determines that the prediction result of the to-be-encoded node is the third prediction result, that is, if at least one first subnode in the first plane of the to-be-encoded node is occupied, and at least one second subnode in the second plane is occupied, for the to-be-encoded subnode of the to-be-encoded node, the encoder may also obtain the neighboring node of the to-be-encoded subnode, and determine the context of the to-be-encoded subnode based on the occupancy case of the neighboring node.

Optionally, that the encoder obtains the neighboring node of the to-be-encoded subnode, and determines the context of the to-be-encoded subnode based on the occupancy case of the neighboring node may be implemented in two different manners. The following describes the two manners in detail.

Manner 1

Partitioning based on the octree is used as an example. In a partitioning manner of breadth-first traversal based on the octree, neighbor information that the encoder can obtain when encoding the to-be-encoded subnode in the to-be-encoded node includes neighboring subnodes in three target directions. For example, the encoder obtains neighboring subnodes of the to-be-encoded subnode in three directions: left, front, and lower, where the neighboring subnodes include three coplanar neighboring subnodes, three collinear neighboring subnodes, and one co-point neighboring subnode of the to-be-encoded subnode of the current node.

Figure 4A:
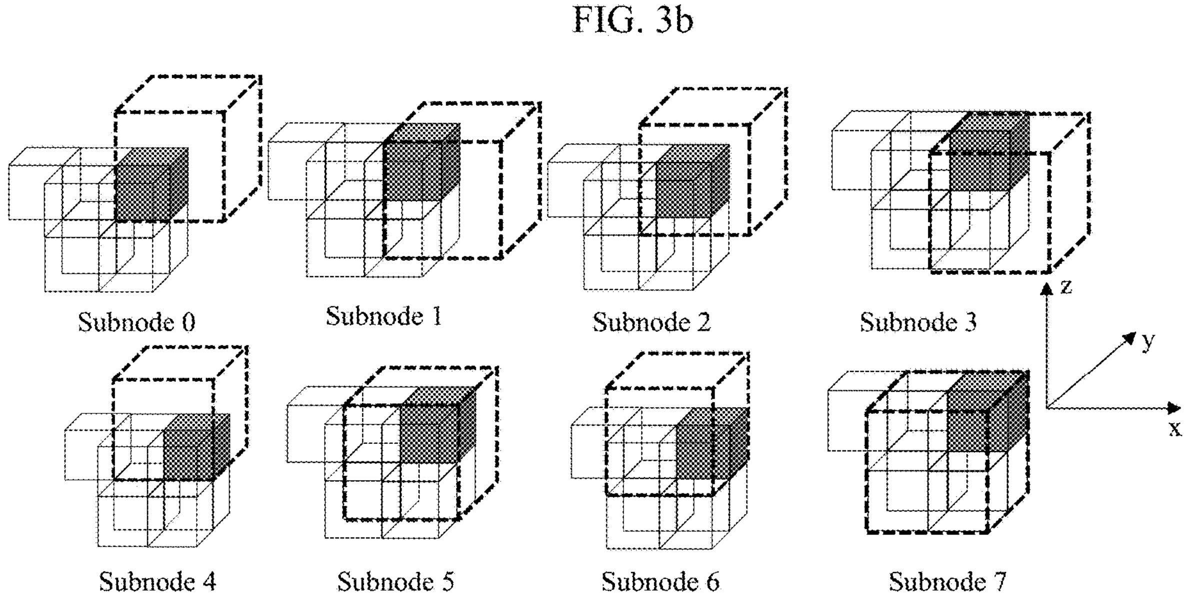
FIG. 4*a* is a schematic diagram of to-be-encoded subnodes and neighboring subnodes in a point cloud sequence.

A context for a subnode level is designed as follows: For a to-be-encoded subnode, the encoder finds occupancy cases of three coplanar neighboring subnodes, three collinear neighboring subnodes, and one co-point neighboring subnode in the left, front, and lower directions on the same level as the to-be-encoded subnode, and a neighboring subnode that is two subnode side lengths away from the current to-be-encoded subnode in a negative direction in a dimension with a shortest subnode side length. A shortest subnode side length in the x-axis direction is used as an example. A reference node selected for each subnode is shown in FIG. 4*a*, where a dashed-line box represents the current to-be-encoded node, a filled box represents the current to-be-encoded subnode, and a solid-line box represents a neighboring subnode selected for each subnode.

The encoder considers in detail the occupancy cases of the three coplanar subnodes, the three collinear subnodes, and the subnode that is two subnode side lengths away from the current to-be-encoded subnode in the negative direction in the dimension with the shortest subnode side length, and there are a total of $2^7=128$ occupancy cases for the seven subnodes. If not all the seven subnodes are unoccupied, there are $2^7-1=127$ cases, and one context is assigned to each case. If all the seven subnodes are unoccupied, the occupancy case of the co-point neighboring subnode is considered. There are two possibilities for this co-point neighboring subnode: occupied or unoccupied. One separate context is assigned to a case that this co-point neighboring subnode is occupied. If this co-point neighboring subnode is also unoccupied, occupancy cases of neighboring nodes at a to-be-encoded node level are further considered. In this way, a total of $127+2-1=128$ contexts can be obtained based on the occupancy cases of the neighboring subnodes at a to-be-encoded subnode level.

Figure 4B:
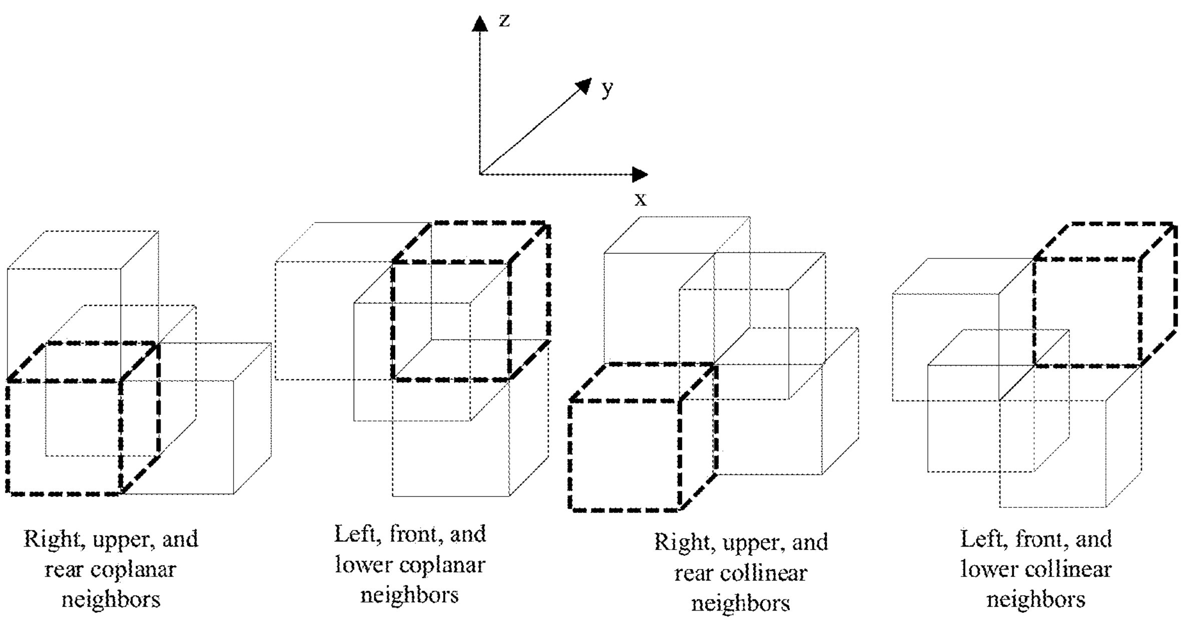
FIG. 4*b* is a schematic diagram of to-be-encoded nodes and neighboring nodes in a point cloud sequence.

If all eight neighboring subnodes at the same level as the to-be-encoded subnode are unoccupied, occupancy cases of four groups of neighboring nodes at the to-be-encoded node level as shown in FIG. 4*b* are further obtained. Dashed-line boxes represent to-be-encoded nodes, and solid-line boxes represent neighboring nodes. For the to-be-encoded node level, a context is determined according to the following steps.

1. First, coplanar neighboring nodes in three preset directions of the to-be-encoded node are obtained. For example, three right, upper, and rear coplanar neighboring nodes of the to-be-encoded node are obtained. There are a total of $2^3=8$ possibilities for occupancy cases of the three right, upper, and rear coplanar neighboring nodes of the to-be-encoded node. One context is assigned to each case that not all the neighboring nodes are unoccupied, and then the position of the to-be-encoded subnode in the to-be-encoded node is considered. A total of $(8-1)\times 8=56$ contexts are provided for this group of coplanar neighboring nodes. If all the three right, upper, and rear coplanar neighboring nodes of the to-be-encoded node are unoccupied, occupancy cases of remaining three groups of neighboring nodes (that is, left, front, and lower coplanar neighbors, right, upper, and rear collinear neighbors, and left, front, and lower collinear neighbors) at the to-be-encoded node level are further obtained.

2. A distance between a most recently occupied node and the current node is obtained. A specific correspondence between occupancy cases of neighboring nodes and distances is shown in Table 1.

TABLE 1

Correspondence between occupancy cases of neighboring nodes at the to-be-encoded node level and distances

| Occupancy cases of neighboring nodes at the to-be-encoded node level | Distance |
|---|---|
| Left, front, and lower coplanar neighboring nodes are occupied, or right, upper, and rear collinear neighboring nodes are occupied | 1 |
| Left, front, and lower coplanar neighboring nodes and right, upper, and rear collinear neighboring nodes are all unoccupied, and left, front, and lower collinear neighboring nodes are occupied | 2 |
| Four groups of neighboring nodes at the to-be-encoded node level are all unoccupied | 3 |

It can be learned from Table 1 that there are three values for the distance. One context is assigned to each of the three values, and then the position of the to-be-encoded subnode in the to-be-encoded node is considered. There are a total of 3×8=24 contexts.

So far, the total number of contexts determined based on the foregoing manner 1 is: 128+56+24=208, and the encoder assigns an adaptive probability model to each context.

Manner 2

Figure 5A:
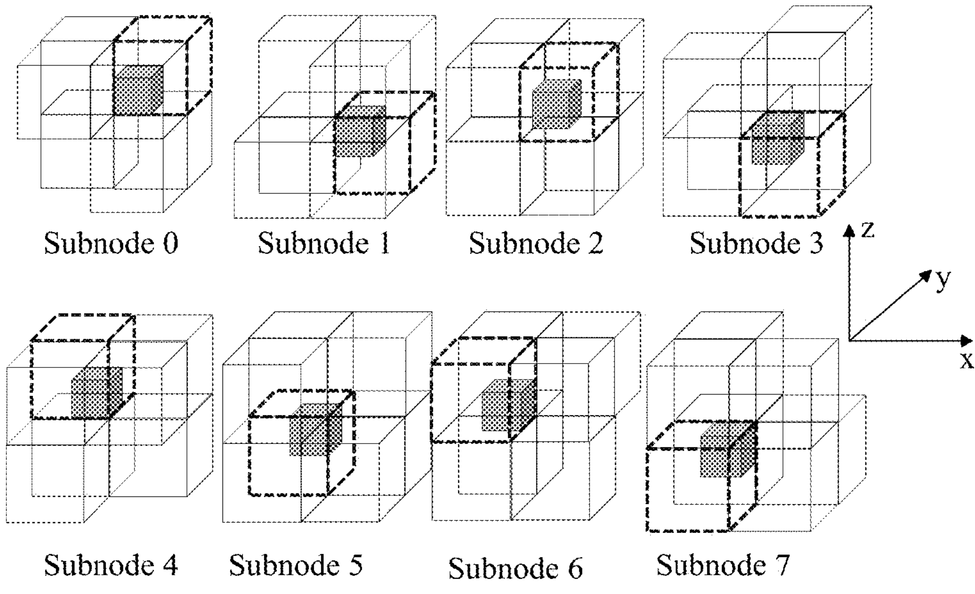
FIG. 5*a* is a first schematic diagram of to-be-encoded nodes, to-be-encoded subnodes, and neighboring nodes in a point cloud sequence.

After the encoder determines the to-be-encoded node, for each to-be-encoded subnode, the encoder can obtain six coplanar and collinear neighboring nodes of the to-be-encoded node on the to-be-encoded node level, as shown in FIG. 5*a*. In FIG. 5*a*, a dashed-line box represents the to-be-encoded node, a filled box represents each to-be-encoded subnode, and a solid-line box represents a coplanar or collinear neighboring node of the to-be-encoded node. For three of the coplanar neighboring nodes, considering each distribution case, there are a total of $2^3=8$ cases. For remaining three collinear neighboring nodes, if only the number of occupied nodes among the three neighboring nodes is calculated, there are four cases in total: 0, 1, 2, and 3. There are a total of 4×8=32 cases for a combination of the two, and one context is configured for each case. A total of 32 contexts are obtained for the to-be-encoded node level.

Figure 5B:
FIG. 5*b* is a second schematic diagram of to-be-encoded nodes, to-be-encoded subnodes, and neighboring subnodes in a point cloud sequence.
Figure 5B:
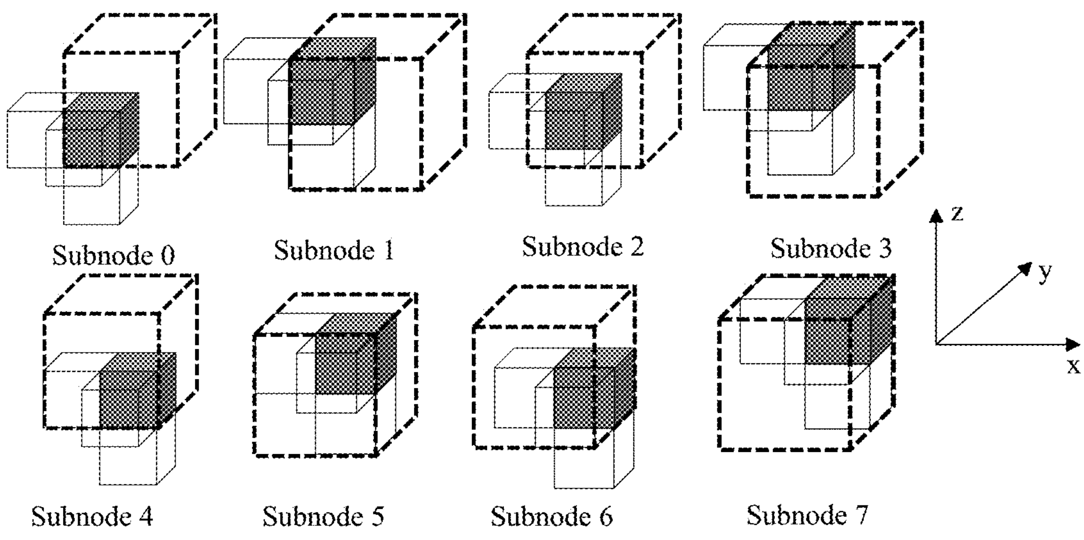

Further, for each to-be-encoded subnode, neighboring subnodes in a target direction at the same level as the to-be-encoded subnode are obtained. For example, three left, front, and lower (in a negative direction of each coordinate axis) coplanar neighboring subnodes of the to-be-encoded subnode are obtained, as shown in FIG. 5*b*. In FIG. 5*b*, a dashed-line box represents the to-be-encoded node, a filled box represents the to-be-encoded subnode, and a solid-line box represents a coplanar neighboring node at the same level as the to-be-encoded subnode. There are a total of $2^3=8$ occupancy cases for the three coplanar neighboring nodes at the same level as the to-be-encoded subnode, and one context is assigned to each case. A total of eight contexts are provided for the to-be-encoded subnode.

Contexts at the to-be-encoded node level and the to-be-encoded subnode level do not interfere with each other. Therefore, a total of 32×8=256 contexts can be determined in the manner 2. The encoder assigns an adaptive probability model to each context.

Optionally, in a case that the prediction result of the to-be-encoded node is the third prediction result, or that the prediction result of the to-be-encoded node is the first prediction result and that the to-be-encoded subnode is located in the first plane of the to-be-encoded node, or in a case that the prediction result of the to-be-encoded node is the second prediction result and that the to-be-encoded subnode is located in the second plane of the to-be-encoded node, the encoder may determine the context of the to-be-encoded subnode based on the foregoing manner 1 or manner 2.

Figure 6:
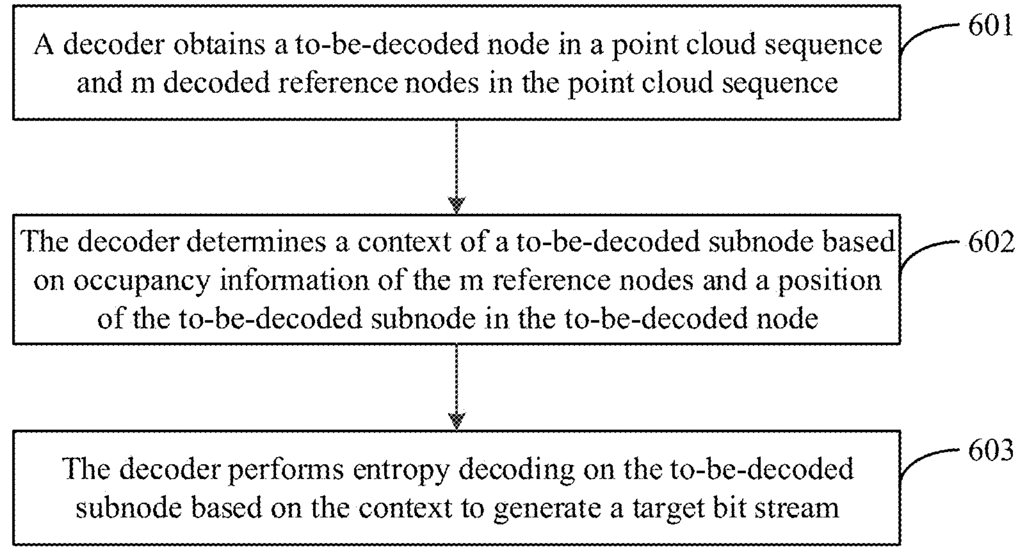
FIG. 6 is a flowchart of a point cloud decoding method according to an embodiment of this application.

An embodiment of this application further provides a point cloud decoding method. FIG. 6 is a flowchart of a point cloud decoding method according to an embodiment of this application. As shown in FIG. 6, the method includes the following steps.

Step 601: A decoder obtains a to-be-decoded node in a point cloud sequence and m decoded reference nodes in the point cloud sequence, where m is a positive integer.

Step 602: The decoder determines a context of a to-be-decoded subnode based on occupancy information of the m reference nodes and a position of the to-be-decoded subnode in the to-be-decoded node, where the to-be-decoded subnode is any subnode obtained by partitioning the to-be-decoded node based on a structure tree.

Step 603: The decoder performs entropy decoding on the to-be-decoded subnode based on the context to generate a target bit stream.

Optionally, step 601 specifically includes:

the decoder obtains the to-be-decoded node in the point cloud sequence;

the decoder obtains, based on a node decoding order, k decoded nodes previous to the to-be-decoded node, where k is a positive integer; and in a case that at least one of the previous k decoded nodes has a target planar feature, the decoder obtains the m decoded reference nodes in the point cloud sequence.

Optionally, that the decoder obtains the m decoded reference nodes in the point cloud sequence in a case that at least one of the previous k decoded nodes has a target planar feature includes:

in a case that the number of decoded nodes with the target planar feature among the previous k decoded nodes is greater than or equal to a first threshold, the decoder obtains the m decoded reference nodes in the point cloud sequence, where the first threshold is a positive integer less than k.

Optionally, step 601 may further specifically include:

the decoder obtains the to-be-decoded node in the point cloud sequence;

the decoder determines a target coordinate system based on coordinate values of the to-be-decoded node;

the decoder determines that nodes belonging to a same node partitioning level as the to-be-decoded node and having a same coordinate value on a target coordinate axis as the to-be-decoded node, in the point cloud sequence, are candidate reference nodes, where the target coordinate axis is any coordinate axis in the target coordinate system, and the target coordinate axis is perpendicular to a target plane; and the decoder obtains the m reference nodes from the candidate reference nodes.

Optionally, the occupancy information of the m encoded reference nodes in the point cloud sequence includes the number of occupied first subnodes and the number of occupied second subnodes in the m reference nodes; and the method further includes:

the decoder determines a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system; and the decoder obtains the number of the occupied first subnodes and the number of the occupied second subnodes in the m reference nodes, where the first subnodes are subnodes located in the first plane and the second subnodes are subnodes located in the second plane.

Optionally, step 602 specifically includes:

the decoder predicts occupancy information of the to-be-decoded node based on the occupancy information of the m reference nodes, and determines a prediction result of the to-be-decoded node; and the decoder determines the context of the to-be-decoded subnode based on the prediction result of the to-be-decoded node and the position of the to-be-decoded subnode in the to-be-decoded node.

Optionally, that the decoder determines the context of the to-be-decoded subnode based on the prediction result of the to-be-decoded node and the position of the to-be-decoded subnode in the to-be-decoded node includes:

the decoder determines a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system;

the decoder obtains the number of occupied first subnodes and the number of occupied second subnodes in the m reference nodes, where the first subnodes are subnodes located in the first plane and the second subnodes are subnodes located in the second plane; and the decoder predicts the occupancy information of the to-be-decoded node based on the number of the occupied first subnodes and the number of the occupied second subnodes in the m reference nodes, and determines the prediction result of the to-be-decoded node.

Optionally, that the decoder predicts the occupancy information of the to-be-decoded node based on the number of the occupied first subnodes and the number of the occupied second subnodes in the m reference nodes, and determines the prediction result of the to-be-decoded node includes at least one of the following:

in a case that the number of the occupied first subnodes and the number of the occupied second subnodes in the m reference nodes meet a first condition, the decoder predicts that at least one first subnode in the to-be-decoded node is occupied and that no second subnode in the to-be-decoded node is occupied, and determines that the prediction result of the to-be-decoded node is a first prediction result, where the first condition is that the number of the occupied first subnodes in the m reference nodes is greater than a second threshold and that the number of the occupied second subnodes in the m reference nodes is less than a third threshold;

in a case that the number of the occupied first subnodes and the number of the occupied second subnodes in the m reference nodes meet a second condition, the decoder predicts that at least one second subnode in the to-be-decoded node is occupied and that no first subnode in the to-be-decoded node is occupied, and determines that the prediction result of the to-be-decoded node is a second prediction result, where the second condition is that the number of the occupied second subnodes in the m reference nodes is greater than the second threshold and that the number of the occupied first subnodes in the m reference nodes is less than the third threshold; and in a case that the number of the occupied first subnodes and the number of the occupied second subnodes in the m reference nodes meet neither of the first condition and the second condition, the decoder predicts that at least one first subnode and at least one second subnode in the to-be-decoded node are occupied, and determines that the prediction result of the to-be-decoded node is a third prediction result.

Optionally, step 602 may specifically include at least one of the following:

in a case that the prediction result of the to-be-decoded node is the first prediction result and that the to-be-decoded subnode is located in the second plane of the to-be-decoded node, the decoder determines that a first preset model is the context of the to-be-decoded subnode;

in a case that the prediction result of the to-be-decoded node is the second prediction result and that the to-be-decoded subnode is located in the first plane of the to-be-decoded node, the decoder determines that a second preset model is the context of the to-be-decoded subnode;

in a case that the prediction result of the to-be-decoded node is the first prediction result and that the to-be-decoded subnode is located in the first plane of the to-be-decoded node, the decoder obtains a neighboring node of the to-be-decoded subnode, and determines the context of the to-be-decoded subnode based on an occupancy case of the neighboring node;

in a case that the prediction result of the to-be-decoded node is the second prediction result and that the to-be-decoded subnode is located in the second plane of the to-be-decoded node, the decoder obtains a neighboring node of the to-be-decoded subnode, and determines the context of the to-be-decoded subnode based on an occupancy case of the neighboring node; and in a case that the prediction result of the to-be-decoded node is the third prediction result, the decoder obtains a neighboring node of the to-be-decoded subnode, and determines the context of the to-be-decoded subnode based on an occupancy case of the neighboring node.

Optionally, in a case that the first subnodes and the second subnodes in the reference nodes are obtained through partitioning based on an n-ary tree, the second threshold is a positive integer less than or equal to $$\frac{n}{2} \times m - 1,$$

the third threshold is a positive integer less than or equal to $$\frac{n}{2} \times m,$$

and n is a positive integer.

In this embodiment of this application, the decoder can predict the occupancy information of the to-be-decoded node based on the occupancy information of the decoded reference nodes, and determine the context of the to-be-decoded subnode based on the prediction result of the to-be-decoded node and the position of the to-be-decoded subnode in the to-be-decoded node. In this way, the occupancy information of the decoded nodes in the point cloud sequence can be better used, decompression performance of the point cloud can be improved, and decoding efficiency of the decoder can be improved.

It should be noted that the point cloud decoding method provided in this embodiment of this application is different from the foregoing point cloud encoding method only in different execution entities. For specific execution steps and an implementation process, refer to the detailed description in the foregoing point cloud encoding method embodiment. Details are not described herein again.

The point cloud encoding method provided in the embodiments of this application may be performed by a point cloud encoding apparatus. A point cloud encoding apparatus provided in the embodiments of this application is described by assuming that the point cloud encoding apparatus performs the point cloud encoding method in the embodiments of this applications.

Figure 7:
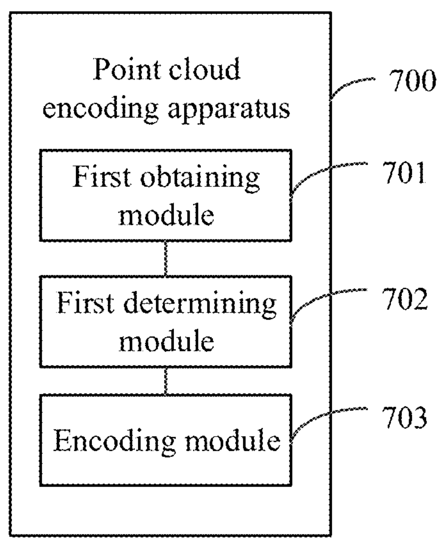
FIG. 7 is a structural diagram of a point cloud encoding apparatus according to an embodiment of this application.

FIG. 7 is a structural diagram of a point cloud encoding apparatus according to an embodiment of this application. As shown in FIG. 7, the point cloud encoding apparatus 700 includes:

- a first obtaining module 701, configured to obtain a to-be-encoded node in a point cloud sequence and m encoded reference nodes in the point cloud sequence, where m is a positive integer;
- a first determining module 702, configured to determine a context of a to-be-encoded subnode based on occupancy information of the m reference nodes and a position of the to-be-encoded subnode in the to-be-encoded node, where the to-be-encoded subnode is any subnode obtained by partitioning the to-be-encoded node based on a structure tree; and
- an encoding module 703, configured to perform entropy encoding on the to-be-encoded subnode based on the context to generate a target bit stream.

Optionally, the first obtaining module 701 is further configured to:

- obtain the to-be-encoded node in the point cloud sequence;
- obtain, based on a node encoding order, k encoded nodes previous to the to-be-encoded node, where k is a positive integer; and
- in a case that at least one of the previous k encoded nodes has a target planar feature, obtain the m encoded reference nodes in the point cloud sequence.

Optionally, the first obtaining module 701 is further configured to:

- in a case that the number of encoded nodes with the target planar feature among the previous k encoded nodes is greater than or equal to a first threshold, obtain the m encoded reference nodes in the point cloud sequence, where
- the first threshold is a positive integer less than k.

Optionally, the first obtaining module 701 is further configured to:

- obtain the to-be-encoded node in the point cloud sequence;
- determine a target coordinate system based on coordinate values of the to-be-encoded node;
- determine that nodes belonging to a same node partitioning level as the to-be-encoded node and having a same coordinate value on a target coordinate axis as the to-be-encoded node, in the point cloud sequence, are candidate reference nodes, where the target coordinate axis is any coordinate axis in the target coordinate system, and the target coordinate axis is perpendicular to a target plane; and
- obtain the m reference nodes from the candidate reference nodes.

Optionally, the occupancy information of the m encoded reference nodes in the point cloud sequence includes the number of occupied first subnodes and the number of occupied second subnodes in the m reference nodes; and the point cloud encoding apparatus 700 further includes:

- a third determining module, configured to determine a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system; and
- a third obtaining module, configured to obtain the number of the occupied first subnodes and the number of the occupied second subnodes in the m reference nodes, where the first subnodes are subnodes located in the first plane and the second subnodes are subnodes located in the second plane.

Optionally, the first determining module 702 is further configured to:

- predict occupancy information of the to-be-encoded node based on the occupancy information of the m reference nodes, and determine a prediction result of the to-be-encoded node; and
- determine the context of the to-be-encoded subnode based on the prediction result of the to-be-encoded node and the position of the to-be-encoded subnode in the to-be-encoded node.

Optionally, the first determining module 702 is further configured to:

- determine a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system;
- obtain the number of occupied first subnodes and the number of occupied second subnodes in the m reference nodes, where the first subnodes are subnodes located in the first plane and the second subnodes are subnodes located in the second plane; and
- predict the occupancy information of the to-be-encoded node based on the number of the occupied first subnodes and the number of the occupied second subnodes in the m reference nodes, and determine the prediction result of the to-be-encoded node.

Optionally, the first determining module 702 is further configured to perform at least one of the following:

- in a case that the number of the occupied first subnodes and the number of the occupied second subnodes in the m reference nodes meet a first condition, predicting that at least one first subnode in the to-be-encoded node is occupied and that no second subnode in the to-beencoded node is occupied, and determining that the prediction result of the to-be-encoded node is a first prediction result, where the first condition is that the number of the occupied first subnodes in the m reference nodes is greater than a second threshold and that the number of the occupied second subnodes in the m reference nodes is less than a third threshold;

in a case that the number of the occupied first subnodes and the number of the occupied second subnodes in the m reference nodes meet a second condition, predicting that at least one second subnode in the to-be-encoded node is occupied and that no first subnode in the to-be-encoded node is occupied, and determining that the prediction result of the to-be-encoded node is a second prediction result, where the second condition is that the number of the occupied second subnodes in the m reference nodes is greater than the second threshold and that the number of the occupied first subnodes in the m reference nodes is less than the third threshold; and in a case that the number of the occupied first subnodes and the number of the occupied second subnodes in the m reference nodes meet neither of the first condition and the second condition, predicting that at least one first subnode and at least one second subnode in the to-be-encoded node are occupied, and determining that the prediction result of the to-be-encoded node is a third prediction result.

Optionally, the first determining module 702 is further configured to perform at least one of the following:

in a case that the prediction result of the to-be-encoded node is the first prediction result and that the to-be-encoded subnode is located in the second plane of the to-be-encoded node, determining that a first preset model is the context of the to-be-encoded subnode;

in a case that the prediction result of the to-be-encoded node is the second prediction result and that the to-be-encoded subnode is located in the first plane of the to-be-encoded node, determining that a second preset model is the context of the to-be-encoded subnode;

in a case that the prediction result of the to-be-encoded node is the first prediction result and that the to-be-encoded subnode is located in the first plane of the to-be-encoded node, obtaining a neighboring node of the to-be-encoded subnode, and determining the context of the to-be-encoded subnode based on an occupancy case of the neighboring node;

in a case that the prediction result of the to-be-encoded node is the second prediction result and that the to-be-encoded subnode is located in the second plane of the to-be-encoded node, obtaining a neighboring node of the to-be-encoded subnode, and determining the context of the to-be-encoded subnode based on an occupancy case of the neighboring node; and in a case that the prediction result of the to-be-encoded node is the third prediction result, obtaining a neighboring node of the to-be-encoded subnode, and determining the context of the to-be-encoded subnode based on an occupancy case of the neighboring node.

Optionally, in a case that the first subnodes and the second subnodes in the reference nodes are obtained through partitioning based on an n-ary tree, the second threshold is a positive integer less than or equal to $$\frac{n}{2} \times m - 1,$$

the third threshold is a positive integer less than or equal to $$\frac{n}{2} \times m,$$

and n is a positive integer.

In this embodiment of this application, the point cloud encoding apparatus 700 can predict the occupancy information of the to-be-encoded node based on the occupancy information of the encoded reference nodes, and determine the context of the to-be-encoded subnode based on the prediction result of the to-be-encoded node and the position of the to-be-encoded subnode in the to-be-encoded node. In this way, the occupancy information of the encoded nodes in the point cloud sequence can be better used, geometric compression performance of the point cloud can be improved, and encoding efficiency of the point cloud encoding apparatus 700 can be improved.

The point cloud encoding apparatus 700 in this embodiment of this application may be an electronic device, for example, an electronic device with an operating system, or may be a component in an electronic device, for example, an integrated circuit or a chip. The electronic device may be a terminal, or may be other devices than a terminal. For example, the terminal may include but is not limited to the foregoing illustrated type of the terminal 11. The other devices may be a server, a network attached storage (NAS), and the like. This is not specifically limited in this embodiment of this application.

The point cloud encoding apparatus 700 provided in this embodiment of this application can implement each process implemented by the method embodiment in FIG. 1, with the same technical effect achieved. To avoid repetition, details are not described herein again.

The point cloud decoding method provided in the embodiments of this application may be performed by a point cloud decoding apparatus. A point cloud decoding apparatus provided in the embodiments of this application is described by assuming that the point cloud decoding apparatus performs the point cloud decoding method in the embodiments of this application.

Figure 8:
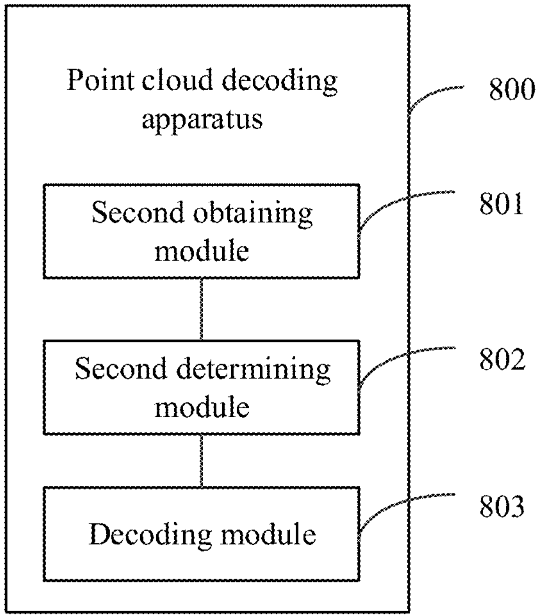
FIG. 8 is a structural diagram of a point cloud decoding apparatus according to an embodiment of this application.

FIG. 8 is a structural diagram of a point cloud decoding apparatus according to an embodiment of this application. As shown in FIG. 8, the point cloud decoding apparatus 800 includes:

a second obtaining module 801, configured to obtain a to-be-decoded node in a point cloud sequence and m decoded reference nodes in the point cloud sequence, where m is a positive integer;

a second determining module 802, configured to determine a context of a to-be-decoded subnode based on occupancy information of the m reference nodes and a position of the to-be-decoded subnode in the to-be-decoded node, where the to-be-decoded subnode is any subnode obtained by partitioning the to-be-decoded node based on a structure tree; and a decoding module 803, configured to perform entropy decoding on the to-be-decoded subnode based on the context to generate a target bit stream.

Optionally, the second obtaining module 801 is further configured to:

obtain the to-be-decoded node in the point cloud sequence;

obtain, based on a node decoding order, k decoded nodes previous to the to-be-decoded node, where k is a positive integer; and in a case that at least one of the previous k decoded nodes has a target planar feature, obtain the m decoded reference nodes in the point cloud sequence.

Optionally, the second obtaining module 801 is further configured to:

in a case that the number of decoded nodes with the target planar feature among the previous k decoded nodes is greater than or equal to a first threshold, obtain the m decoded reference nodes in the point cloud sequence, where the first threshold is a positive integer less than k.

Optionally, the second obtaining module 801 is further configured to:

obtain the to-be-decoded node in the point cloud sequence;

determine a target coordinate system based on coordinate values of the to-be-decoded node;

determine that nodes belonging to a same node partitioning level as the to-be-decoded node and having a same coordinate value on a target coordinate axis as the to-be-decoded node, in the point cloud sequence, are candidate reference nodes, where the target coordinate axis is any coordinate axis in the target coordinate system, and the target coordinate axis is perpendicular to a target plane; and obtain the m reference nodes from the candidate reference nodes.

Optionally, the occupancy information of the m encoded reference nodes in the point cloud sequence includes the number of occupied first subnodes and the number of occupied second subnodes in the m reference nodes; and the point cloud decoding apparatus 800 further includes:

a fourth determining module, configured to determine a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system; and a fourth obtaining module, configured to obtain the number of the occupied first subnodes and the number of the occupied second subnodes in the m reference nodes, where the first subnodes are subnodes located in the first plane and the second subnodes are subnodes located in the second plane.

Optionally, the second determining module 802 is further configured to:

predict occupancy information of the to-be-decoded node based on the occupancy information of the m reference nodes, and determine a prediction result of the to-be-decoded node; and determine the context of the to-be-decoded subnode based on the prediction result of the to-be-decoded node and the position of the to-be-decoded subnode in the to-be-decoded node.

Optionally, the second determining module 802 is further configured to:

determine a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system;

obtain the number of occupied first subnodes and the number of occupied second subnodes in the m reference nodes, where the first subnodes are subnodes located in the first plane and the second subnodes are subnodes located in the second plane; and predict the occupancy information of the to-be-decoded node based on the number of the occupied first subnodes and the number of the occupied second subnodes in the m reference nodes, and determine the prediction result of the to-be-decoded node.

Optionally, the second determining module 802 is further configured to perform at least one of the following:

in a case that the number of the occupied first subnodes and the number of the occupied second subnodes in the m reference nodes meet a first condition, predicting that at least one first subnode in the to-be-decoded node is occupied and that no second subnode in the to-be-decoded node is occupied, and determining that the prediction result of the to-be-decoded node is a first prediction result, where the first condition is that the number of the occupied first subnodes in the m reference nodes is greater than a second threshold and that the number of the occupied second subnodes in the m reference nodes is less than a third threshold;

in a case that the number of the occupied first subnodes and the number of the occupied second subnodes in the m reference nodes meet a second condition, predicting that at least one second subnode in the to-be-decoded node is occupied and that no first subnode in the to-be-decoded node is occupied, and determining that the prediction result of the to-be-decoded node is a second prediction result, where the second condition is that the number of the occupied second subnodes in the m reference nodes is greater than the second threshold and that the number of the occupied first subnodes in the m reference nodes is less than the third threshold; and in a case that the number of the occupied first subnodes and the number of the occupied second subnodes in the m reference nodes meet neither of the first condition and the second condition, predicting that at least one first subnode and at least one second subnode in the to-be-decoded node are occupied, and determining that the prediction result of the to-be-decoded node is a third prediction result.

Optionally, the second determining module 802 is further configured to perform at least one of the following:

in a case that the prediction result of the to-be-decoded node is the first prediction result and that the to-be-decoded subnode is located in the second plane of the to-be-decoded node, determining that a first preset model is the context of the to-be-decoded subnode;

in a case that the prediction result of the to-be-decoded node is the second prediction result and that the to-be-decoded subnode is located in the first plane of the to-be-decoded node, determining that a second preset model is the context of the to-be-decoded subnode;

in a case that the prediction result of the to-be-decoded node is the first prediction result and that the to-be-decoded subnode is located in the first plane of the to-be-decoded node, obtaining a neighboring node of the to-be-decoded subnode, and determining the context of the to-be-decoded subnode based on an occupancy case of the neighboring node;

in a case that the prediction result of the to-be-decoded node is the second prediction result and that the to-be-decoded subnode is located in the second plane of the to-be-decoded node, obtaining a neighboring node of the to-be-decoded subnode, and determining the context of the to-be-decoded subnode based on an occupancy case of the neighboring node; and in a case that the prediction result of the to-be-decoded node is the third prediction result, obtaining a neighboring node of the to-be-decoded subnode, and determining the context of the to-be-decoded subnode based on an occupancy case of the neighboring node.

Optionally, in a case that the first subnodes and the second subnodes in the reference nodes are obtained through partitioning based on an n-ary tree, the second threshold is a positive integer less than or equal to $$\frac{n}{2} \times m - 1,$$

the third threshold is a positive integer less than or equal to $$\frac{n}{2} \times m,$$

and n is a positive integer.

In this embodiment of this application, the point cloud decoding apparatus 800 can predict the occupancy information of the to-be-decoded node based on the occupancy information of the decoded reference nodes, and determine the context of the to-be-decoded subnode based on the prediction result of the to-be-decoded node and the position of the to-be-decoded subnode in the to-be-decoded node. In this way, the occupancy information of the decoded nodes in the point cloud sequence can be better used, decompression performance of the point cloud can be improved, and decoding efficiency of the point cloud decoding apparatus 800 can be improved.

The point cloud decoding apparatus 800 in this embodiment of this application may be an electronic device, for example, an electronic device with an operating system, or may be a component in an electronic device, for example, an integrated circuit or a chip. The electronic device may be a terminal, or may be other devices than a terminal. For example, the terminal may include but is not limited to the foregoing illustrated type of the terminal 11. The other devices may be a server, a network attached storage (NAS), and the like. This is not specifically limited in this embodiment of this application.

The point cloud decoding apparatus 800 provided in this embodiment of this application can implement each process implemented by the method embodiment in FIG. 6, with the same technical effect achieved. To avoid repetition, details are not described herein again.

Figure 9:
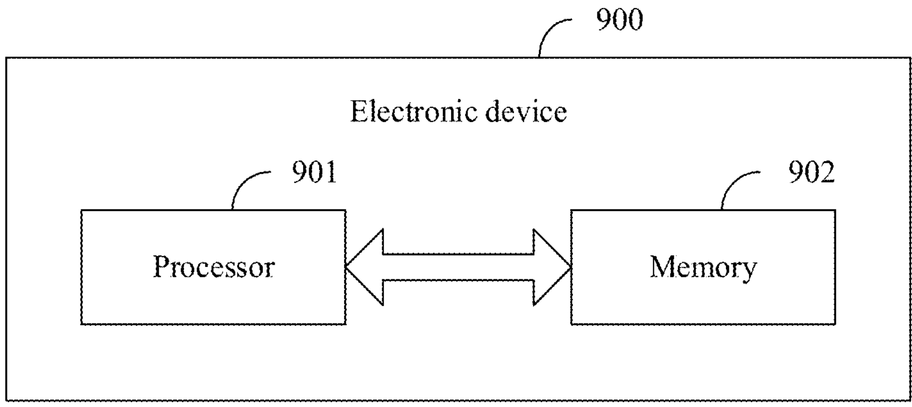
FIG. 9 is a structural diagram of an electronic device according to an embodiment of this application.

As shown in FIG. 9, an embodiment of this application further provides an electronic device 900, including a processor 901 and a memory 902. The memory 902 stores a program or instructions capable of running on the processor 901. For example, when the electronic device 900 is an encoder, and the program or instructions are executed by the processor 901, each step of the foregoing method embodiment in FIG. 1 is implemented, with the same technical effect achieved. When the electronic device 900 is a decoder, and the program or instructions are executed by the processor 901, each step of the foregoing method embodiment in FIG. 6 is implemented, with the same technical effect achieved. To avoid repetition, details are not described herein again.

Figure 10:
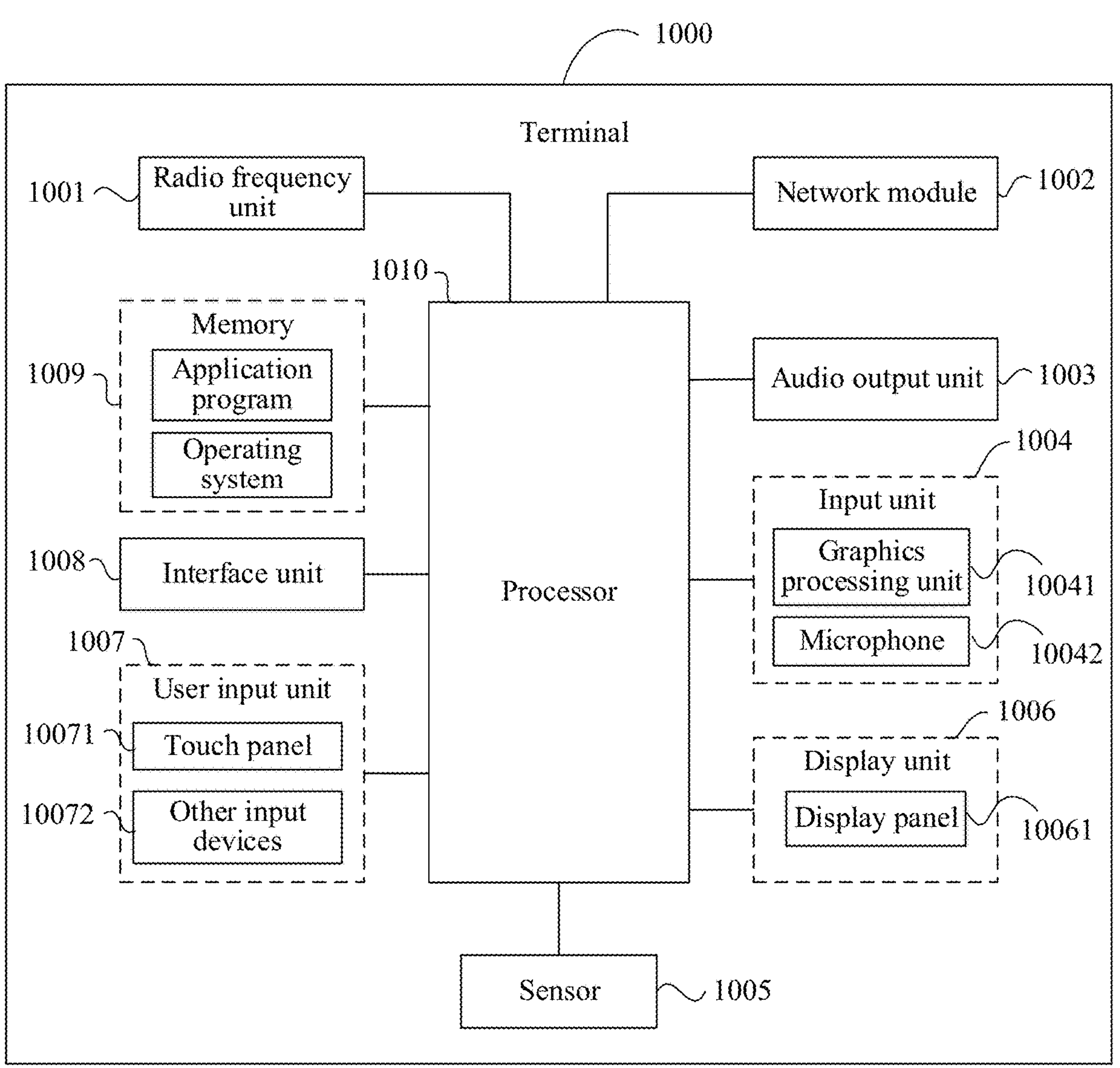
FIG. 10 is a structural diagram of a terminal according to an embodiment of this application.

An embodiment of this application further provides a terminal. Each implementation process and implementation of the foregoing method embodiments in FIG. 1 and FIG. 6 can be applied to the terminal embodiment, with the same technical effect achieved. Specifically, FIG. 10 is a schematic diagram of a hardware structure of a terminal for implementing an embodiment of this application.

The terminal 1000 includes but is not limited to at least some components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art may understand that the terminal 1000 may further include a power supply (for example, a battery) supplying power to all components. The power supply may be logically connected to the processor 1010 through a power management system. In this way, functions such as charge management, discharge management, and power consumption management are implemented by using the power management system. The terminal structure shown in FIG. 10 does not constitute a limitation on the terminal. The terminal may include more or fewer components than those shown in the figure, or some components are combined, or component arrangements are different. Details are not described herein again.

It should be understood that, in this embodiment of this application, the input unit 1004 may include a graphics processing unit (GPU) 10041 and a microphone 10042. The graphics processing unit 10041 processes image data of a still picture or video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, or the like. The user input unit 1007 includes at least one of a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function button (such as a volume control button or a power button), a trackball, a mouse, and a joystick. Details are not described herein again.

In this embodiment of this application, after receiving downlink data from a network-side device, the radio frequency unit 1001 may transmit the downlink data to the processor 1010 for processing. In addition, the radio frequency unit 1001 may send uplink data to the network-side device. Usually, the radio frequency unit 1001 includes but is not limited to an antenna, an amplifier, a transceiver, a coupler, a low noise amplifier, a duplexer, and the like.

The memory 1009 may be configured to store software programs or instructions and various data. The memory 1009 may primarily include a first storage area for storing programs or instructions and a second storage area for storing data. The first storage area may store an operating system, an application program or instructions required by at least one function (such as an audio play function and an image play function), and the like. In addition, the memory 1009 may include a volatile memory or a non-volatile memory, or the memory 1009 may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data rate SDRAM, DDR SDRAM), an enhanced synchronous dynamic random access memory (Enhanced SDRAM, ESDRAM), a synchlink dynamic random access memory (Synch Link DRAM, SLDRAM), and a direct rambus random access memory (Direct Rambus RAM, DRRAM). The memory 1009 in this embodiment of this application includes but is not limited to these and any other suitable types of memories.

The processor 1010 may include one or more processing units. Optionally, the processor 1010 integrates an application processor and a modem processor. The application processor mainly processes operations related to the operating system, a user interface, an application program, and the like. The modem processor mainly processes a wireless communication signal. For example, the modem processor is a baseband processor. It may be understood that the modem processor may alternatively be not integrated in the processor 1010.

When the terminal 1000 is an encoder, the processor 1010 is configured to:

obtain a to-be-encoded node in a point cloud sequence and m encoded reference nodes in the point cloud sequence, where m is a positive integer;

determine a context of a to-be-encoded subnode based on occupancy information of the m reference nodes and a position of the to-be-encoded subnode in the to-be-encoded node, where the to-be-encoded subnode is any subnode obtained by partitioning the to-be-encoded node based on a structure tree; and perform entropy encoding on the to-be-encoded subnode based on the context to generate a target bit stream.

Optionally, the processor 1010 is further configured to:

obtain the to-be-encoded node in the point cloud sequence;

obtain, based on a node encoding order, k encoded nodes previous to the to-be-encoded node, where k is a positive integer; and in a case that at least one of the previous k encoded nodes has a target planar feature, obtain the m encoded reference nodes in the point cloud sequence.

Optionally, the processor 1010 is further configured to:

in a case that the number of encoded nodes with the target planar feature among the previous k encoded nodes is greater than or equal to a first threshold, obtain the m encoded reference nodes in the point cloud sequence, where the first threshold is a positive integer less than k.

Optionally, the processor 1010 is further configured to:

obtain the to-be-encoded node in the point cloud sequence;

determine a target coordinate system based on coordinate values of the to-be-encoded node;

determine that nodes belonging to a same node partitioning level as the to-be-encoded node and having a same coordinate value on a target coordinate axis as the to-be-encoded node, in the point cloud sequence, are candidate reference nodes, where the target coordinate axis is any coordinate axis in the target coordinate system, and the target coordinate axis is perpendicular to a target plane; and obtain the m reference nodes from the candidate reference nodes.

Optionally, the occupancy information of the m encoded reference nodes in the point cloud sequence includes the number of occupied first subnodes and the number of occupied second subnodes in the m reference nodes; and the processor 1010 is further configured to:

determine a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system; and obtain the number of the occupied first subnodes and the number of the occupied second subnodes in the m reference nodes, where the first subnodes are subnodes located in the first plane and the second subnodes are subnodes located in the second plane.

Optionally, the processor 1010 is further configured to:

predict occupancy information of the to-be-encoded node based on the occupancy information of the m reference nodes, and determine a prediction result of the to-be-encoded node; and determine the context of the to-be-encoded subnode based on the prediction result of the to-be-encoded node and the position of the to-be-encoded subnode in the to-be-encoded node.

Optionally, the processor 1010 is further configured to:

determine a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system;

obtain the number of the occupied first subnodes and the number of the occupied second subnodes in the m reference nodes, where the first subnodes are subnodes located in the first plane and the second subnodes are subnodes located in the second plane; and predict the occupancy information of the to-be-encoded node based on the number of the occupied first subnodes and the number of the occupied second subnodes in the m reference nodes, and determine the prediction result of the to-be-encoded node.

Optionally, the processor 1010 is further configured to:

in a case that the number of the occupied first subnodes and the number of the occupied second subnodes in the m reference nodes meet a first condition, predict that at least one first subnode in the to-be-encoded node is occupied and that no second subnode in the to-be-encoded node is occupied, and determine that the prediction result of the to-be-encoded node is a first prediction result, where the first condition is that the number of the occupied first subnodes in the m reference nodes is greater than a second threshold and that the number of the occupied second subnodes in the m reference nodes is less than a third threshold;

in a case that the number of the occupied first subnodes and the number of the occupied second subnodes in the m reference nodes meet a second condition, predict that at least one second subnode in the to-be-encoded node is occupied and that no first subnode in the to-be-encoded node is occupied, and determine that the prediction result of the to-be-encoded node is a second prediction result, where the second condition is that the number of the occupied second subnodes in the m reference nodes is greater than the second threshold and that the number of the occupied first subnodes in the m reference nodes is less than the third threshold; and in a case that the number of the occupied first subnodes and the number of the occupied second subnodes in the m reference nodes meet neither of the first condition and the second condition, predict that at least one first subnode and at least one second subnode in the to-be-encoded node are occupied, and determine that the prediction result of the to-be-encoded node is a third prediction result.

Optionally, the processor 1010 is further configured to:

in a case that the prediction result of the to-be-encoded node is the first prediction result and that the to-be-encoded subnode is located in the second plane of the to-be-encoded node, determine that a first preset model is the context of the to-be-encoded subnode;

in a case that the prediction result of the to-be-encoded node is the second prediction result and that the to-be-encoded subnode is located in the first plane of the to-be-encoded node, determine that a second preset model is the context of the to-be-encoded subnode;

in a case that the prediction result of the to-be-encoded node is the first prediction result and that the to-be-encoded subnode is located in the first plane of the to-be-encoded node, obtain a neighboring node of the to-be-encoded subnode, and determine the context of the to-be-encoded subnode based on an occupancy case of the neighboring node;

in a case that the prediction result of the to-be-encoded node is the second prediction result and that the to-be-encoded subnode is located in the second plane of the to-be-encoded node, obtain a neighboring node of the to-be-encoded subnode, and determine the context of the to-be-encoded subnode based on an occupancy case of the neighboring node; and in a case that the prediction result of the to-be-encoded node is the third prediction result, obtain a neighboring node of the to-be-encoded subnode, and determine the context of the to-be-encoded subnode based on an occupancy case of the neighboring node.

Optionally, in a case that the first subnodes and the second subnodes in the reference nodes are obtained through partitioning based on an n-ary tree, the second threshold is a positive integer less than or equal to $$\frac{n}{2} \times m - 1,$$

the third threshold is a positive integer less than or equal to $$\frac{n}{2} \times m,$$

and n is a positive integer.

Alternatively, when the terminal 1000 is a decoder, the processor 1010 is configured to:

obtain a to-be-decoded node in a point cloud sequence and m decoded reference nodes in the point cloud sequence, where m is a positive integer;

determine a context of a to-be-decoded subnode based on occupancy information of the m reference nodes and a position of the to-be-decoded subnode in the to-be-decoded node, where the to-be-decoded subnode is any subnode obtained by partitioning the to-be-decoded node based on a structure tree; and perform entropy decoding on the to-be-decoded subnode based on the context to generate a target bit stream.

Optionally, the processor 1010 is further configured to:

obtain the to-be-decoded node in the point cloud sequence;

obtain, based on a node decoding order, k decoded nodes previous to the to-be-decoded node, where k is a positive integer; and in a case that at least one of the previous k decoded nodes has a target planar feature, obtain the m decoded reference nodes in the point cloud sequence.

Optionally, the processor 1010 is further configured to:

in a case that the number of decoded nodes with the target planar feature among the previous k decoded nodes is greater than or equal to a first threshold, obtain the m decoded reference nodes in the point cloud sequence, where the first threshold is a positive integer less than k.

Optionally, the processor 1010 is further configured to:

obtain the to-be-decoded node in the point cloud sequence;

determine a target coordinate system based on coordinate values of the to-be-decoded node;

determine that nodes belonging to a same node partitioning level as the to-be-decoded node and having a same coordinate value on a target coordinate axis as the to-be-decoded node, in the point cloud sequence, are candidate reference nodes, where the target coordinate axis is any coordinate axis in the target coordinate system, and the target coordinate axis is perpendicular to a target plane; and obtain the m reference nodes from the candidate reference nodes.

Optionally, the occupancy information of the m encoded reference nodes in the point cloud sequence includes the number of occupied first subnodes and the number of occupied second subnodes in the m reference nodes; and the processor 1010 is further configured to:

determine a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system; and obtain the number of the occupied first subnodes and the number of the occupied second subnodes in the m reference nodes, where the first subnodes are subnodes located in the first plane and the second subnodes are subnodes located in the second plane.

Optionally, the processor 1010 is further configured to:

predict occupancy information of the to-be-decoded node based on the occupancy information of the m reference nodes, and determine a prediction result of the to-be-decoded node; and determine the context of the to-be-decoded subnode based on the prediction result of the to-be-decoded node and the position of the to-be-decoded subnode in the to-be-decoded node.

Optionally, the processor 1010 is further configured to:

determine a first plane and a second plane of the node, where the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system;

obtain the number of occupied first subnodes and the number of occupied second subnodes in the m reference nodes, where the first subnodes are subnodes located in the first plane and the second subnodes are subnodes located in the second plane; and predict the occupancy information of the to-be-decoded node based on the number of the occupied first subnodes and the number of the occupied second subnodes in the m reference nodes, and determine the prediction result of the to-be-decoded node.

Optionally, the processor 1010 is further configured to:

in a case that the number of the occupied first subnodes and the number of the occupied second subnodes in the m reference nodes meet a first condition, predict that at least one first subnode in the to-be-decoded node is occupied and that no second subnode in the to-be-decoded node is occupied, and determine that the prediction result of the to-be-decoded node is a first prediction result, where the first condition is that the number of the occupied first subnodes in the m reference nodes is greater than a second threshold and that the number of the occupied second subnodes in the m reference nodes is less than a third threshold;

in a case that the number of the occupied first subnodes and the number of the occupied second subnodes in the m reference nodes meet a second condition, predict that at least one second subnode in the to-be-decoded node is occupied and that no first subnode in the to-be-decoded node is occupied, and determine that the prediction result of the to-be-decoded node is a second prediction result, where the second condition is that the number of the occupied second subnodes in the m reference nodes is greater than the second threshold and that the number of the occupied first subnodes in the m reference nodes is less than the third threshold; and in a case that the number of the occupied first subnodes and the number of the occupied second subnodes in the m reference nodes meet neither of the first condition and the second condition, predict that at least one first subnode and at least one second subnode in the to-be-decoded node are occupied, and determine that the prediction result of the to-be-decoded node is a third prediction result.

Optionally, the processor 1010 is further configured to:

in a case that the prediction result of the to-be-decoded node is the first prediction result and that the to-be-decoded subnode is located in the second plane of the to-be-decoded node, determine that a first preset model is the context of the to-be-decoded subnode;

in a case that the prediction result of the to-be-decoded node is the second prediction result and that the to-be-decoded subnode is located in the first plane of the to-be-decoded node, determine that a second preset model is the context of the to-be-decoded subnode;

in a case that the prediction result of the to-be-decoded node is the first prediction result and that the to-be-decoded subnode is located in the first plane of the to-be-decoded node, obtain a neighboring node of the to-be-decoded subnode, and determine the context of the to-be-decoded subnode based on an occupancy case of the neighboring node;

in a case that the prediction result of the to-be-decoded node is the second prediction result and that the to-be-decoded subnode is located in the second plane of the to-be-decoded node, obtain a neighboring node of the to-be-decoded subnode, and determine the context of the to-be-decoded subnode based on an occupancy case of the neighboring node; and in a case that the prediction result of the to-be-decoded node is the third prediction result, obtain a neighboring node of the to-be-decoded subnode, and determine the context of the to-be-decoded subnode based on an occupancy case of the neighboring node.

Optionally, in a case that the first subnodes and the second subnodes in the reference nodes are obtained through partitioning based on an n-ary tree, the second threshold is a positive integer less than or equal to $$\frac{n}{2} \times m - 1,$$

the third threshold is a positive integer less than or equal to $$\frac{n}{2} \times m,$$

and n is a positive integer.

The terminal 1000 provided in this embodiment of this application can better use the occupancy information of the encoded nodes and the decoded nodes in the point cloud sequence, improve geometric compression performance of the point cloud, and improve encoding efficiency and decoding efficiency.

An embodiment of this application further provides a readable storage medium. The readable storage medium may be volatile or non-volatile. The readable storage medium stores a program or instructions. When the program or instructions are executed by a processor, each process of the foregoing method embodiment in FIG. 1 or FIG. 6 is implemented, with the same technical effect achieved. To avoid repetition, details are not described herein again.

The processor is a processor in the terminal in the foregoing embodiment. The readable storage medium includes a computer-readable storage medium, such as a computer read-only memory ROM, a random access memory RAM, a magnetic disk, or an optical disc.

In addition, an embodiment of this application provides a chip. The chip includes a processor and a communication interface. The communication interface is coupled to the processor. The processor is configured to run a program or instructions to implement each process of the foregoing method embodiment shown in FIG. 1 or FIG. 6, with the same technical effect achieved. To avoid repetition, details are not described herein again.

It should be understood that the chip provided in this embodiment of this application may also be referred to as a system-level chip, a system chip, a chip system, a system-on-chip, or the like.

In addition, an embodiment of this application provides a computer program or program product. The computer program or program product is stored in a storage medium. The computer program or program product is executed by at least one processor to implement each process of the foregoing method embodiment in FIG. 1 or FIG. 6, with the same technical effect achieved. To avoid repetition, details are not described herein again.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A point cloud encoding method, comprising:

obtaining, by an encoder, a to-be-encoded node in a point cloud sequence;

obtaining, by the encoder based on a node encoding order, k encoded nodes previous to the to-be-encoded node, wherein k is a positive integer greater than 1;

when at least one of the previous k encoded nodes has a target planar feature, obtaining, by the encoder, m encoded reference nodes in the point cloud sequence, wherein m is a positive integer;

determining, by the encoder, a context of a to-be-encoded subnode based on occupancy information of the m reference nodes and a position of the to-be-encoded subnode in the to-be-encoded node, wherein the to-be-encoded subnode is any subnode obtained by partitioning the to-be-encoded node based on a structure tree; and performing, by the encoder, entropy encoding on the to-be-encoded subnode based on the context to generate a target bit stream;

wherein the obtaining, by an encoder, the m encoded reference nodes in the point cloud sequence comprises:

determining, by the encoder, a target coordinate system based on coordinate values of the to-be-encoded node;

determining, by the encoder, that nodes belonging to a same node partitioning level as the to-be-encoded node and having a same coordinate value on a target coordinate axis as the to-be-encoded node, in the point cloud sequence, are candidate reference nodes, wherein the target coordinate axis is any coordinate axis in the target coordinate system, and the target coordinate axis is perpendicular to a target plane; and obtaining, by the encoder, the m reference nodes from the candidate reference nodes.

2. The method according to claim 1, wherein the obtaining, by the encoder, the m encoded reference nodes in the point cloud sequence when at least one of the previous k encoded nodes has a target planar feature comprises:

when the number of encoded nodes with the target planar feature among the previous k encoded nodes is greater than or equal to a first threshold, obtaining, by the encoder, the m encoded reference nodes in the point cloud sequence, wherein the first threshold is a positive integer less than k.

3. The method according to claim 1, wherein the occupancy information of the m encoded reference nodes in the point cloud sequence comprises the number of occupied first subnodes and the number of occupied second subnodes in the m reference nodes; and the method further comprises:

determining, by the encoder, a first plane and a second plane of the node, wherein the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system; and obtaining, by the encoder, the number of the occupied first subnodes and the number of the occupied second subnodes in the m reference nodes, wherein the first subnodes are subnodes located in the first plane and the second subnodes are subnodes located in the second plane.

4. The method according to claim 1, wherein the determining, by the encoder, a context of a to-be-encoded subnode based on occupancy information of the m reference nodes and a position of the to-be-encoded subnode in the to-be-encoded node comprises:

predicting, by the encoder, occupancy information of the to-be-encoded node based on the occupancy information of the m reference nodes, and determining a prediction result of the to-be-encoded node; and determining, by the encoder, the context of the to-be-encoded subnode based on the prediction result of the to-be-encoded node and the position of the to-be-encoded subnode in the to-be-encoded node.

5. The method according to claim 4, wherein the predicting, by the encoder, occupancy information of the to-be-encoded node based on the occupancy information of the m reference nodes, and determining a prediction result of the to-be-encoded node comprises:

determining, by the encoder, a first plane and a second plane of the node, wherein the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system;

obtaining, by the encoder, the number of occupied first subnodes and the number of occupied second subnodes in the m reference nodes, wherein the first subnodes are subnodes located in the first plane and the second subnodes are subnodes located in the second plane; and predicting, by the encoder, the occupancy information of the to-be-encoded node based on the number of the occupied first subnodes and the number of the occupied second subnodes in the m reference nodes, and determining the prediction result of the to-be-encoded node.

6. The method according to claim 5, wherein the predicting, by the encoder, the occupancy information of the to-be-encoded node based on the number of the occupied first subnodes and the number of the occupied second subnodes in the m reference nodes, and determining the prediction result of the to-be-encoded node comprises at least one of the following:

in a case that the number of the occupied first subnodes and the number of the occupied second subnodes in the m reference nodes meet a first condition, predicting, by the encoder, that at least one first subnode in the to-be-encoded node is occupied and that no second subnode in the to-be-encoded node is occupied, and determining that the prediction result of the to-be-encoded node is a first prediction result, wherein the first condition is that the number of the occupied first subnodes in the m reference nodes is greater than a second threshold and that the number of the occupied second subnodes in the m reference nodes is less than a third threshold;

in a case that the number of the occupied first subnodes and the number of the occupied second subnodes in the m reference nodes meet a second condition, predicting, by the encoder, that at least one second subnode in the to-be-encoded node is occupied and that no first subnode in the to-be-encoded node is occupied, and determining that the prediction result of the to-be-encoded node is a second prediction result, wherein the second condition is that the number of the occupied second subnodes in the m reference nodes is greater than the second threshold and that the number of the occupied first subnodes in the m reference nodes is less than the third threshold; or, in a case that the number of the occupied first subnodes and the number of the occupied second subnodes in the m reference nodes meet neither of the first condition and the second condition, predicting, by the encoder, that at least one first subnode and at least one second subnode in the to-be-encoded node are occupied, and determining that the prediction result of the to-be-encoded node is a third prediction result.

7. The method according to claim 6, wherein the determining, by the encoder, the context of the to-be-encoded subnode based on the prediction result and the position of the to-be-encoded subnode in the to-be-encoded node comprises at least one of the following:

in a case that the prediction result of the to-be-encoded node is the first prediction result and that the to-be-encoded subnode is located in the second plane of the to-be-encoded node, determining, by the encoder, that a first preset model is the context of the to-be-encoded subnode;

in a case that the prediction result of the to-be-encoded node is the second prediction result and that the to-be-encoded subnode is located in the first plane of the to-be-encoded node, determining, by the encoder, that a second preset model is the context of the to-be-encoded subnode;

in a case that the prediction result of the to-be-encoded node is the first prediction result and that the to-be-encoded subnode is located in the first plane of the to-be-encoded node, obtaining, by the encoder, a neighboring node of the to-be-encoded subnode, and determining the context of the to-be-encoded subnode based on an occupancy case of the neighboring node;

in a case that the prediction result of the to-be-encoded node is the second prediction result and that the to-be-encoded subnode is located in the second plane of the to-be-encoded node, obtaining, by the encoder, a neighboring node of the to-be-encoded subnode, and determining the context of the to-be-encoded subnode based on an occupancy case of the neighboring node; and in a case that the prediction result of the to-be-encoded node is the third prediction result, obtaining, by the encoder, a neighboring node of the to-be-encoded subnode, and determining the context of the to-be-encoded subnode based on an occupancy case of the neighboring node;

or, wherein in a case that the first subnodes and the second subnodes in the reference nodes are obtained through partitioning based on an n-ary tree, the second threshold is a positive integer less than or equal to $$\frac{n}{2} \times m - 1,$$

the third threshold is a positive integer less than or equal to $$\frac{n}{2} \times m,$$

and n is a positive integer.

8. A point cloud decoding method, comprising:

obtaining, by a decoder, a to-be-decoded node in a point cloud sequence;

obtaining, by the decoder based on a node decoding order, k decoded nodes previous to the to-be-decoded node, wherein k is a positive integer greater than 1;

when at least one of the previous k decoded nodes has a target planar feature, obtaining, by the decoder, m decoded reference nodes in the point cloud sequence, wherein m is a positive integer;

determining, by the decoder, a context of a to-be-decoded subnode based on occupancy information of the m reference nodes and a position of the to-be-decoded subnode in the to-be-decoded node, wherein the to-be-decoded subnode is any subnode obtained by partitioning the to-be-decoded node based on a structure tree; and performing, by the decoder, entropy decoding on the to-be-decoded subnode based on the context to generate a target bit stream;

wherein the obtaining, by the decoder, the m decoded reference nodes in the point cloud sequence comprises:

determining, by the decoder, a target coordinate system based on coordinate values of the to-be-decoded node;

determining, by the decoder, that nodes belonging to a same node partitioning level as the to-be-decoded node and having a same coordinate value on a target coordinate axis as the to-be-decoded node, in the point cloud sequence, are candidate reference nodes, wherein the target coordinate axis is any coordinate axis in the target coordinate system, and the target coordinate axis is perpendicular to a target plane; and obtaining, by the decoder, the m reference nodes from the candidate reference nodes.

9. The method according to claim 8, wherein the obtaining, by the decoder, the m decoded reference nodes in the point cloud sequence when at least one of the previous k decoded nodes has a target planar feature comprises:

when the number of decoded nodes with the target planar feature among the previous k decoded nodes is greater than or equal to a first threshold, obtaining, by the decoder, the m decoded reference nodes in the point cloud sequence, wherein the first threshold is a positive integer less than k.

10. The method according to claim 8, wherein the occupancy information of the m encoded reference nodes in the point cloud sequence comprises the number of occupied first subnodes and the number of occupied second subnodes in the m reference nodes; and the method further comprises:

determining, by the decoder, a first plane and a second plane of the node, wherein the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system; and obtaining, by the decoder, the number of the occupied first subnodes and the number of the occupied second subnodes in the m reference nodes, wherein the first subnodes are subnodes located in the first plane and the second subnodes are subnodes located in the second plane.

11. The method according to claim 10, wherein the determining, by the decoder, a context of a to-be-decoded subnode based on occupancy information of the m reference nodes and a position of the to-be-decoded subnode in the to-be-decoded node comprises:

predicting, by the decoder, occupancy information of the to-be-decoded node based on the occupancy information of the m reference nodes, and determining a prediction result of the to-be-decoded node; and determining, by the decoder, the context of the to-be-decoded subnode based on the prediction result of the to-be-decoded node and the position of the to-be-decoded subnode in the to-be-decoded node.

12. The method according to claim 11, wherein the determining, by the decoder, the context of the to-be-decoded subnode based on the prediction result of the to-be-decoded node and the position of the to-be-decoded subnode in the to-be-decoded node comprises:

determining, by the decoder, a first plane and a second plane of the node, wherein the first plane and the second plane are both parallel to the target plane, the first plane overlaps the second plane in an extension direction of the target coordinate axis, the first plane is closer to a coordinate origin than the second plane, and the coordinate origin is a coordinate origin of the target coordinate system;

obtaining, by the decoder, the number of occupied first subnodes and the number of occupied second subnodes in the m reference nodes, wherein the first subnodes are subnodes located in the first plane and the second subnodes are subnodes located in the second plane; and predicting, by the decoder, the occupancy information of the to-be-decoded node based on the number of the occupied first subnodes and the number of the occupied second subnodes in the m reference nodes, and determining the prediction result of the to-be-decoded node.

13. The method according to claim 12, wherein the predicting, by the decoder, the occupancy information of the to-be-decoded node based on the number of the occupied first subnodes and the number of the occupied second subnodes in the m reference nodes, and determining the prediction result of the to-be-decoded node comprises at least one of the following:

in a case that the number of the occupied first subnodes and the number of the occupied second subnodes in the m reference nodes meet a first condition, predicting, by the decoder, that at least one first subnode in the to-be-decoded node is occupied and that no second subnode in the to-be-decoded node is occupied, and determining that the prediction result of the to-be-decoded node is a first prediction result, wherein the first condition is that the number of the occupied first subnodes in the m reference nodes is greater than a second threshold and that the number of the occupied second subnodes in the m reference nodes is less than a third threshold;

in a case that the number of the occupied first subnodes and the number of the occupied second subnodes in the m reference nodes meet a second condition, predicting, by the decoder, that at least one second subnode in the to-be-decoded node is occupied and that no first subnode in the to-be-decoded node is occupied, and determining that the prediction result of the to-be-decoded node is a second prediction result, wherein the second condition is that the number of the occupied second subnodes in the m reference nodes is greater than the second threshold and that the number of the occupied first subnodes in the m reference nodes is less than the third threshold; or in a case that the number of the occupied first subnodes and the number of the occupied second subnodes in the m reference nodes meet neither of the first condition and the second condition, predicting, by the decoder, that at least one first subnode and at least one second subnode in the to-be-decoded node are occupied, and determining that the prediction result of the to-be-decoded node is a third prediction result.

14. The method according to claim 13, wherein the determining, by the decoder, the context of the to-be-decoded subnode based on the prediction result and the position of the to-be-decoded subnode in the to-be-decoded node comprises at least one of the following:

in a case that the prediction result of the to-be-decoded node is the first prediction result and that the to-be-decoded subnode is located in the second plane of the to-be-decoded node, determining, by the decoder, that a first preset model is the context of the to-be-decoded subnode;

in a case that the prediction result of the to-be-decoded node is the second prediction result and that the to-be-decoded subnode is located in the first plane of the to-be-decoded node, determining, by the decoder, that a second preset model is the context of the to-be-decoded subnode;

in a case that the prediction result of the to-be-decoded node is the first prediction result and that the to-bedecoded subnode is located in the first plane of the to-be-decoded node, obtaining, by the decoder, a neighboring node of the to-be-decoded subnode, and determining the context of the to-be-decoded subnode based on an occupancy case of the neighboring node;

in a case that the prediction result of the to-be-decoded node is the second prediction result and that the to-be-decoded subnode is located in the second plane of the to-be-decoded node, obtaining, by the decoder, a neighboring node of the to-be-decoded subnode, and determining the context of the to-be-decoded subnode based on an occupancy case of the neighboring node; and in a case that the prediction result of the to-be-decoded node is the third prediction result, obtaining, by the decoder, a neighboring node of the to-be-decoded subnode, and determining the context of the to-be-decoded subnode based on an occupancy case of the neighboring node;

or, wherein in a case that the first subnodes and the second subnodes in the reference nodes are obtained through partitioning based on an n-ary tree, the second threshold is a positive integer less than or equal to $$\frac{n}{2} \times m - 1,$$

the third threshold is a positive integer less than or equal to $$\frac{n}{2} \times m,$$

and n is a positive integer.

15. An electronic device, the electronic device being an encoder, comprising a processor and a memory, wherein the memory stores a program or instructions capable of running on the processor, and when the program or instructions are executed by the processor, the steps of the point cloud encoding method according to claim 1 are implemented.

16. An electronic device, the electronic device being a decoder, comprising a processor and a memory, wherein the memory stores a program or instructions capable of running on the processor, and when the program or instructions are executed by the processor, the following steps are implemented:

obtaining a to-be-decoded node in a point cloud sequence;

obtaining, based on a node decoding order, k decoded nodes previous to the to-be-decoded node, wherein k is a positive integer greater than 1;

when at least one of the previous k decoded nodes has a target planar feature, obtaining m decoded reference nodes in the point cloud sequence, wherein m is a positive integer;

determining a context of a to-be-decoded subnode based on occupancy information of the m reference nodes and a position of the to-be-decoded subnode in the to-be-decoded node, wherein the to-be-decoded subnode is any subnode obtained by partitioning the to-be-decoded node based on a structure tree; and performing entropy decoding on the to-be-decoded subnode based on the context to generate a target bit stream;

wherein the obtaining the m decoded reference nodes in the point cloud sequence comprises:

determining a target coordinate system based on coordinate values of the to-be-decoded node;

determining that nodes belonging to a same node partitioning level as the to-be-decoded node and having a same coordinate value on a target coordinate axis as the to-be-decoded node, in the point cloud sequence, are candidate reference nodes, wherein the target coordinate axis is any coordinate axis in the target coordinate system, and the target coordinate axis is perpendicular to a target plane; and obtaining the m reference nodes from the candidate reference nodes.

* * * * *